(12) United States Patent
Kim et al.

(10) Patent No.: US 11,778,613 B2
(45) Date of Patent: Oct. 3, 2023

(54) DOWNLINK SIGNAL RECEPTION METHOD AND USER EQUIPMENT, AND DOWNLINK SIGNAL TRANSMISSION METHOD AND BASE STATION

(71) Applicant: LG ELECTRONICS INC., Seoul (KR)

(72) Inventors: Eunsun Kim, Seoul (KR); Suckchel Yang, Seoul (KR); Hyunsoo Ko, Seoul (KR); Kijun Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 17/188,899

(22) Filed: Mar. 1, 2021

(65) Prior Publication Data

US 2021/0185710 A1    Jun. 17, 2021

Related U.S. Application Data

(63) Continuation of application No. 16/314,340, filed as application No. PCT/KR2017/007013 on Jul. 3, 2017, now Pat. No. 10,973,046.

(60) Provisional application No. 62/491,274, filed on Apr. 28, 2017, provisional application No. 62/476,635, filed on Mar. 24, 2017, provisional application No. 62/454,959, filed on Feb. 6, 2017, provisional
(Continued)

(51) Int. Cl.
*H04W 72/20* (2023.01)
*H04L 5/00* (2006.01)
*H04W 74/08* (2009.01)

(52) U.S. Cl.
CPC .............. *H04W 72/20* (2023.01); *H04L 5/00* (2013.01); *H04W 74/0833* (2013.01)

(58) Field of Classification Search
CPC ..................... H04W 72/1278; H04W 74/0833; H04L 5/00; H04L 5/0044; H04L 5/005; H04L 5/0051; H04L 5/14; H04L 5/0007; H04L 5/0053
USPC ........................................................ 370/336
See application file for complete search history.

(56) References Cited

U.S. PATENT DOCUMENTS 10,499,371 B2 *  12/2019  Xue ................... H04W 72/042
2011/0211489 A1    9/2011  Chung et al.
(Continued)

FOREIGN PATENT DOCUMENTS

WO        2014042373        3/2014

OTHER PUBLICATIONS

U.S. Appl. No. 16/314,340, Final Office Action dated Sep. 25, 2020, 8 pages.
(Continued)

*Primary Examiner* — Mang Hang Yeung
(74) *Attorney, Agent, or Firm* — LEE HONG DEGERMAN KANG WAIMEY

(57) ABSTRACT

A default subcarrier spacing for use in transmission/reception of a broadcast channel is defined for each frequency range. A base station transmits a broadcast channel in a frequency band, using the default subcarrier spacing defined for a frequency range to which the corresponding frequency band belongs. A user equipment attempts to detect a broadcast channel in the frequency band where a cell search is being attempted, using the default subcarrier spacing defined for a frequency range to which the frequency band belongs.

8 Claims, 11 Drawing Sheets

Related U.S. Application Data application No. 62/418,179, filed on Nov. 6, 2016, provisional application No. 62/357,945, filed on Jul. 2, 2016.

(56) References Cited

U.S. PATENT DOCUMENTS

| | | |
|---|---|---|
| 2015/0230261 A1 | 8/2015 | Lo et al. |
| 2018/0206253 A1 | 7/2018 | Yun et al. |
| 2019/0045527 A1 | 2/2019 | Shimezawa |
| 2019/0230696 A1 | 7/2019 | Kim et al. |
| 2020/0099499 A1 | 3/2020 | Yeo et al. |

OTHER PUBLICATIONS

U.S. Appl. No. 16/314,340, Office Action dated Apr. 6, 2020, 9 pages.
PCT International Application No. PCT/KR2017/007013, Written Opinion of the International Searching Authority dated Oct. 18, 2017, 17 pages.
Intel, "Forward compatibility for new radio interface", 3GPP TSG RAN WG1 Meeting #84bis, R1-162381, Apr. 2016, 3 pages.
Sony, "Discussion on frame structure design for NR", 3GPP TSG RAN WG1 Meeting #85, R1-164657, May 2016, 6 pages.

\* cited by examiner

DOWNLINK SIGNAL RECEPTION METHOD AND USER EQUIPMENT, AND DOWNLINK SIGNAL TRANSMISSION METHOD AND BASE STATION

CROSS-REFERENCE TO RELATED APPLICATIONS

This application is a continuation of U.S. patent application Ser. No. 16/314,340, filed on Dec. 28, 2018, which is the National Stage filing under 35 U.S.C. 371 of International Application No. PCT/KR2017/007013, filed on Jul. 3, 2017, which claims the benefit of U.S. Provisional Application No. 62/357,945, filed on Jul. 2, 2016, 62/418,179, filed on Nov. 6, 2016, 62/454,959, filed on Feb. 6, 2017, 62/476,635, filed on Mar. 24, 2017, and 62/491,274, filed on Apr. 28, 2017, the contents of which are all hereby incorporated by reference herein in their entirety.

TECHNICAL FIELD

The present invention relates to a wireless communication system, and more particularly, to a method and apparatus for receiving/transmitting a downlink signal.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at any time and anywhere by connecting a plurality of devices and objects to each other is one main issue to be considered in next generation communication.

Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving a downlink signal by a user equipment in a wireless communication system. The method includes: detecting, in a frequency band, a broadcast channel using a first subcarrier spacing defined with respect to a frequency range to which the frequency band belongs; and receiving, in the frequency band, a downlink data channel carrying system information using a second subcarrier spacing, based on information on the second subcarrier spacing carried by the broadcast channel.

According to another aspect of the present invention, provided herein a method of transmitting a downlink signal by a base station in a wireless communication system. The method include: transmitting, in a frequency band, a broadcast channel using a first subcarrier spacing defined with respect to a frequency range to which the frequency band belongs; and transmitting, in the frequency band, a downlink data channel carrying system information using a second subcarrier spacing, based on information on the second subcarrier spacing carried by the broadcast channel.

According to another aspect of the present invention, provided herein a user equipment for receiving a downlink signal in a wireless communication system. The user equipment includes a radio frequency (RF) unit, and a processor configured to control the RF unit. The processor is configured to: detect, in a frequency band, a broadcast channel using a first subcarrier spacing defined with respect to a frequency range to which the frequency band belongs; and control the RF unit to receive, in the frequency band, a downlink data channel carrying system information using a second subcarrier spacing, based on information on the second subcarrier spacing carried by the broadcast channel.

According to another aspect of the present invention, provided herein a base station for transmitting a downlink signal in a wireless communication system. The base station includes a radio frequency (RF) unit, and a processor configured to control the RF unit. The processor is configured to: control the RF unit to transmit, in a frequency band, a broadcast channel using a first subcarrier spacing defined with respect to a frequency range to which the frequency band belongs; and control the RF unit to transmit, in the frequency band, a downlink data channel carrying system information using a second subcarrier spacing, based on information on the second subcarrier spacing carried by the broadcast channel.

In each aspect of the present invention, the downlink data channel carrying the system information may be transmitted/received using the first subcarrier spacing if the information about the second subcarrier spacing is not present within the broadcast channel.

In each aspect of the present invention, the broadcast channel may carry configuration information on a search space for receiving control information of the downlink data channel and/or time resource information on a time resource on which the system information is transmitted. The time resource information may include a periodicity at which the system information can be transmitted, a time offset between the broadcast channel and a time at which the system information can be transmitted, or a time window in which the system information can be transmitted.

In each aspect of the present invention, the information on the second subcarrier spacing may be information indicating one of candidate subcarrier spacings defined with respect to each carrier range for a data channel.

In each aspect of the present invention, the broadcast channel may carry information on a subcarrier spacing for a random access channel.

The above technical solutions are merely some parts of the examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an example of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

MODE FOR THE INVENTION

Figure 1:
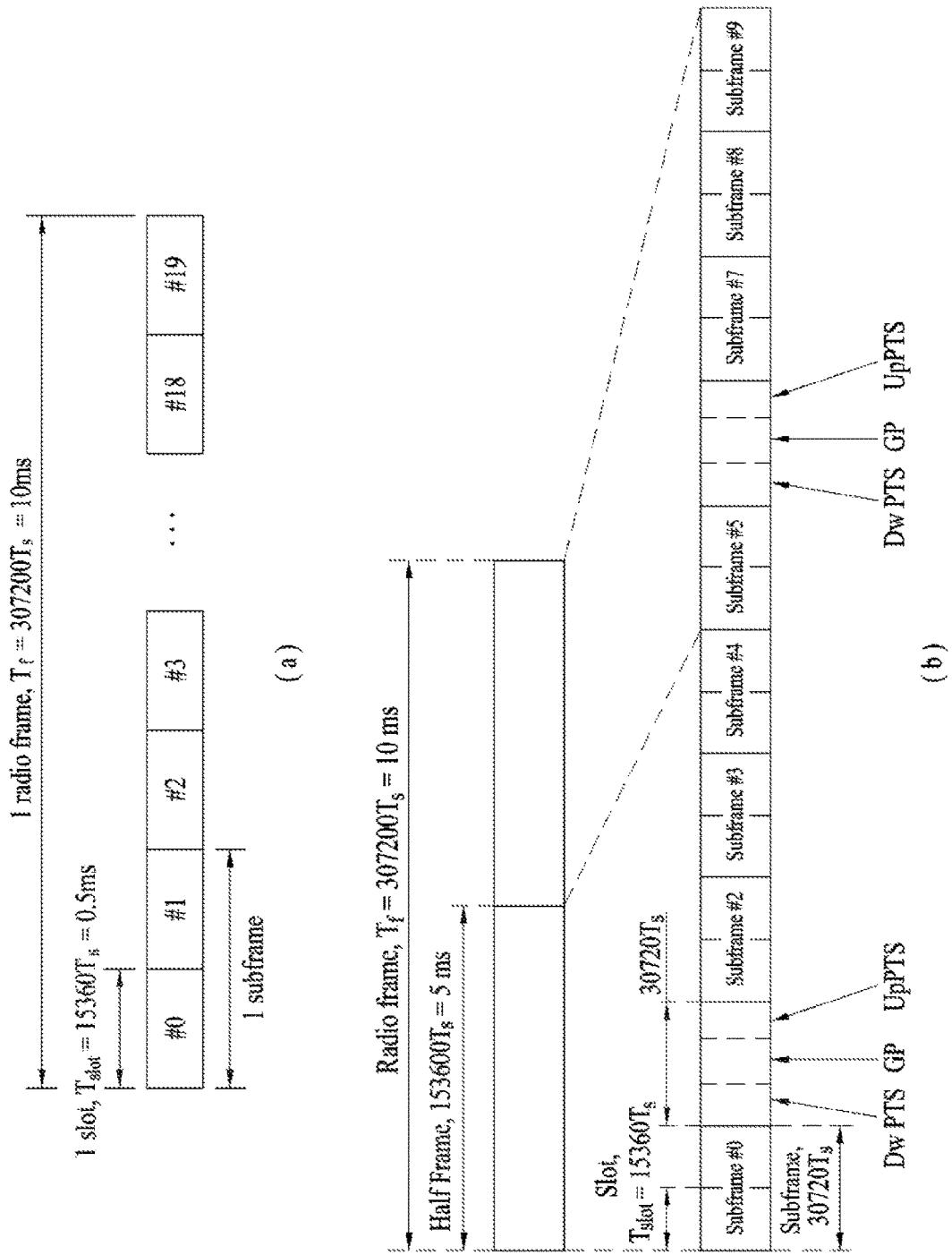
FIG. 1 illustrates the structure of a radio frame used in the LTE/LTE-A based wireless communication system.

Reference will now be made in detail to the exemplary examples of the present invention, examples of which are illustrated in the accompanying drawings. The detailed description, which will be given below with reference to the accompanying drawings, is intended to explain exemplary examples of the present invention, rather than to show the only examples that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In examples of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDS CH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321 and 3GPP TS 36.331 may be referenced.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A TTI refers to an interval at which data may be scheduled. For example, the transmission opportunity of a UL grant or DL grant is given every 1 ms in the current LTE/LTE-A system. The UL/DL grant opportunity is not given several times within a time shorter than 1 ms. Accordingly, the TTI is 1 ms in the current LTE-LTE-A system.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
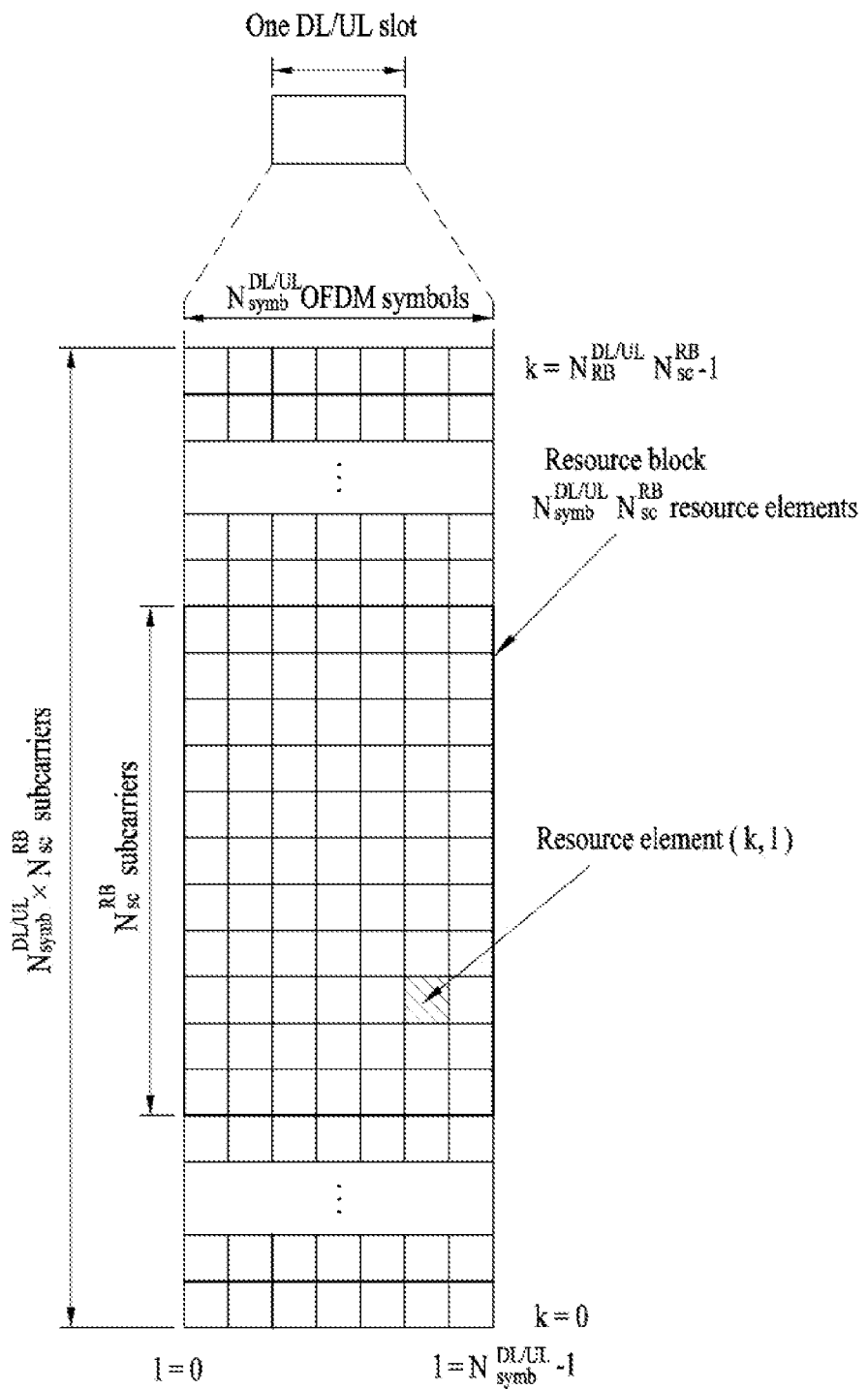
FIG. 2 illustrates the structure of a downlink (DL)/uplink (UL) slot in the LTE/LTE-A based wireless communication system.

FIG. 2 illustrates the structure of a DL/UL slot structure in the LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, examples of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

Figure 3:
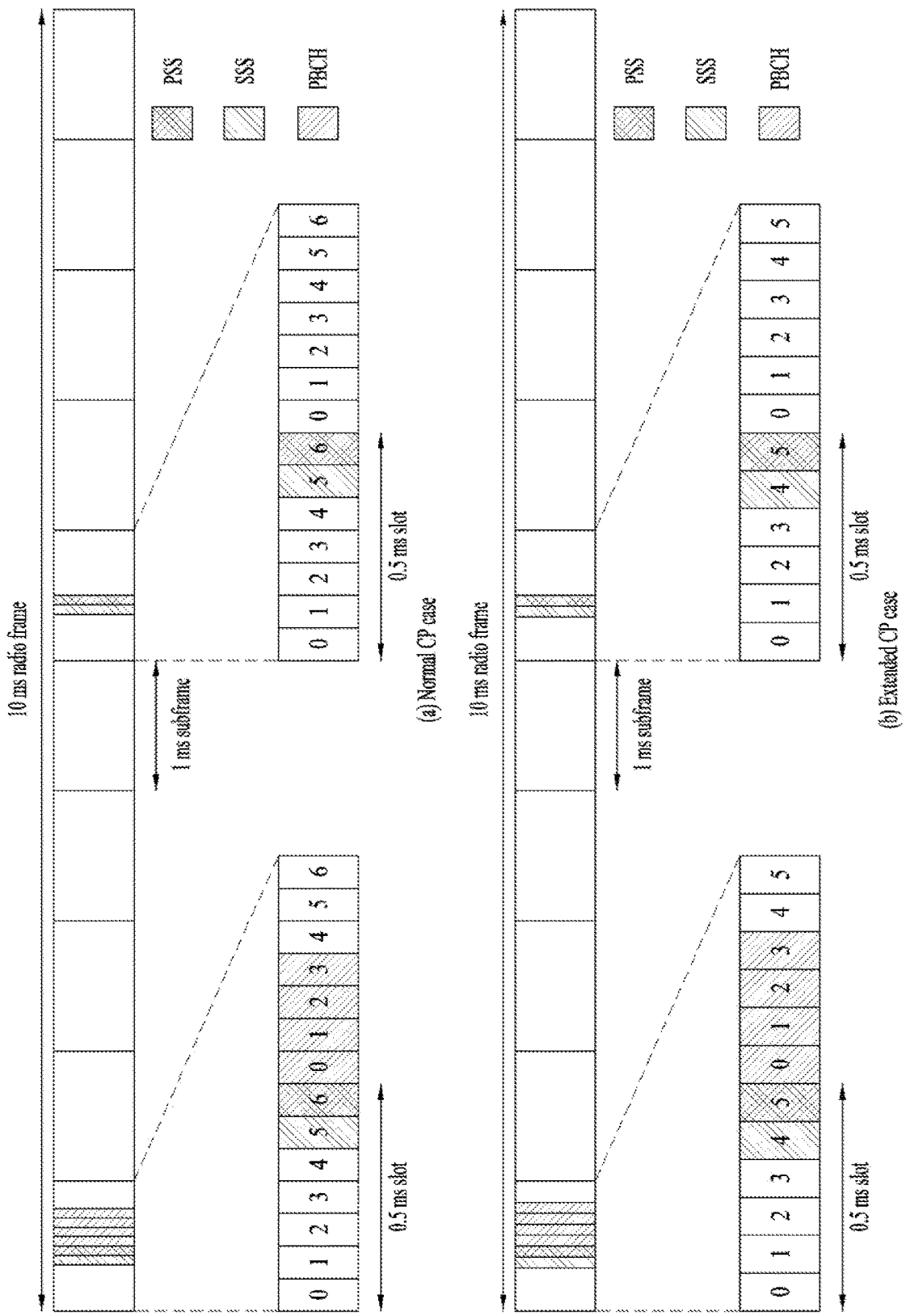
FIG. 3 illustrates a radio frame structure for transmission of a synchronization signal (SS) slot in the LTE/LTE-A based wireless communication system.

FIG. 3 illustrates a radio frame structure for transmission of a synchronization signal (SS) in the LTE/LTE-A based wireless communication system. Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and may be categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also referred to as a random access channel (RACH) procedure. The random access procedure is used for various purposes including initial access, adjustment of UL synchronization, resource assignment, and handover. Random access procedures are categorized into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible for multiple UEs to transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without collision with other UEs.

The contention-based random access procedure includes the following four steps. Messages transmitted in Steps 1 to 4 given below may be referred to as Msg1 to Msg4.

Step 1: RACH preamble (via PRACH) (from UE to eNB)
Step 2: Random access response (RAR) (via PDCCH and PDSCH) (from eNB to UE)
Step 3: Layer 2/layer 3 message (via PUSCH) (from UE to eNB)
Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).

Step 0: RACH preamble assignment (from eNB to UE) through dedicated signaling
Step 1: RACH preamble (via PRACH) (from UE to eNB)
Step 2: RAR (via PDCCH and PDSCH) (from eNB to UE)

After transmitting the RACH preamble, the UE attempts to receive an RAR within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

A random access preamble, i.e., a RACH preamble consists of a cyclic prefix (CP) having a length of $T_{CP}$ and a sequence part having a length of $T_{SEQ}$. $T_{CP}$ and $T_{SEQ}$ depend on a frame structure and a random access configuration, and preamble formats are controlled by higher layers. The RACH preamble is transmitted in a UL subframe. Transmission of random access preambles is restricted to be performed on certain time and frequency resources. Such a resource is referred to as a PRACH resource. PRACH resources are numbered as the subframe number increases in a radio frame and the RPB number increases in the frequency domain so that index 0 may correspond to the lowest PRB and subframe in the radio frame. In addition, random access resources are defined according to a PRACH configuration index (cf. 3GPP TS 36.211). The PRACH configuration index is provided through a higher layer signal (transmitted from an eNB).

In the LTE/LTE-A system, a subcarrier spacing for a random access preamble, i.e., a subcarrier spacing for a RACH preamble, is specified as 1.25 kHz for preamble formats 0 to 3 and 7.5 kHz for preamble format 4 (see 3GPP TS 36.211).

Figure 4:
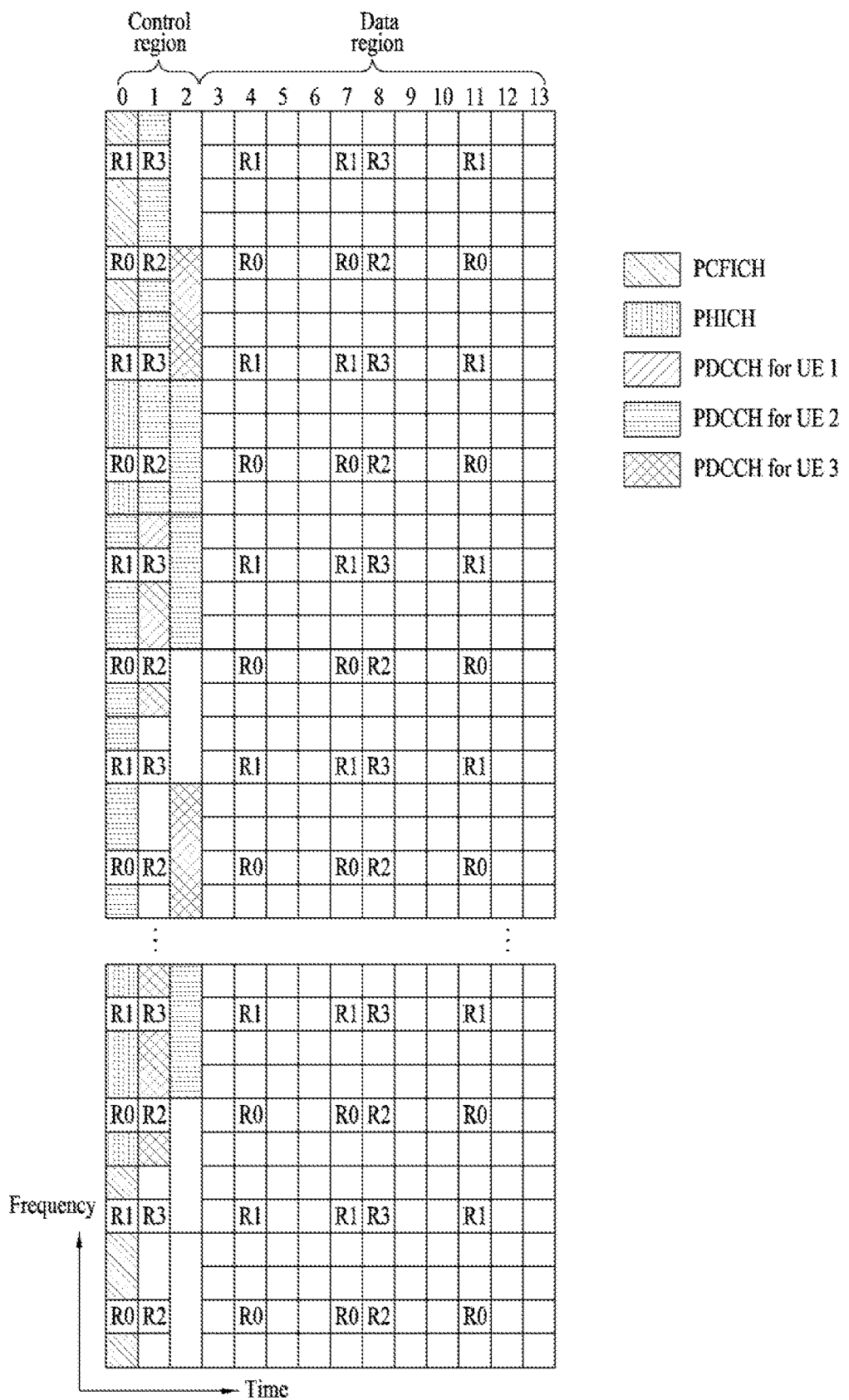
FIG. 4 illustrates the structure of a DL subframe used in the LTE/LTE-A based wireless communication system.

FIG. 4 illustrates the structure of a DL subframe used in the LTE/LTE-A based wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. The following table shows examples of DCI formats.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$. A PDCCH including n consecutive CCEs may be transmitted only on CCEs fulfilling "i mod n=0" wherein i is a CCE number.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. The set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows an example of the aggregation levels defining the search spaces.

TABLE 1

| | Search space $S^{(L)}_k$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The control region of each serving cell consists of a set of CCEs, numbered from 0 to $N_{CCE,k}-1$, where $N_{CCE,k}$ is the total number of CCEs in the control region of subframe k. In the 3GPP LTE/LTE-A system, a set of CCEs at which a PDCCH can be located is defined for each UE. The UE monitors a set of PDCCH candidates on one or more activated serving cells configured as serving cells by higher layer signaling for control information. In this case, monitoring means attempting to decode each of PDCCHs in a set according to all monitored DCI formats. For each serving cell on which PDCCH is monitored, the CCEs corresponding to PDCCH candidates m of the search space $S^{(L)}_k$ are configured by "$L*\{(Y_k+m') \bmod \text{floor}(N_{CCE,k}/L)\}+i$", where i=0, ..., L−1. For the common search space m'=m. For the PDCCH UE specific search space, for the serving cell on which PDCCH is monitored, if the monitoring UE is configured with carrier indicator field then $m'=m+M^{(L)}*n_{CI}$ where $n_{CI}$ is the carrier indicator field (CIF) value, else if the monitoring UE is not configured with carrier indicator field then m'=m, where m=0, 1, ..., $M^{(L)}-1$. $M^{(L)}$ is the number of PDCCH candidates to monitor at aggregation level L in the given search space. The carrier indication field value can be the same as a serving cell index (ServCellIndex). For the common search space, $Y_k$ is set to 0 for the two aggregation levels L=4 and L=8. For the UE-specific search space $S^{(L)}_k$ at aggregation level D, the variable $Y_k$ is defined by "$Y_k = (A \cdot Y_{k-1}) \bmod D$", where $Y_{-1}=n_{RNTI} \neq 0$, A=39827, D=65537 and $k=\text{floor}(n_s/2)$. $n_s$ is the slot number within a radio frame.

Figure 5:
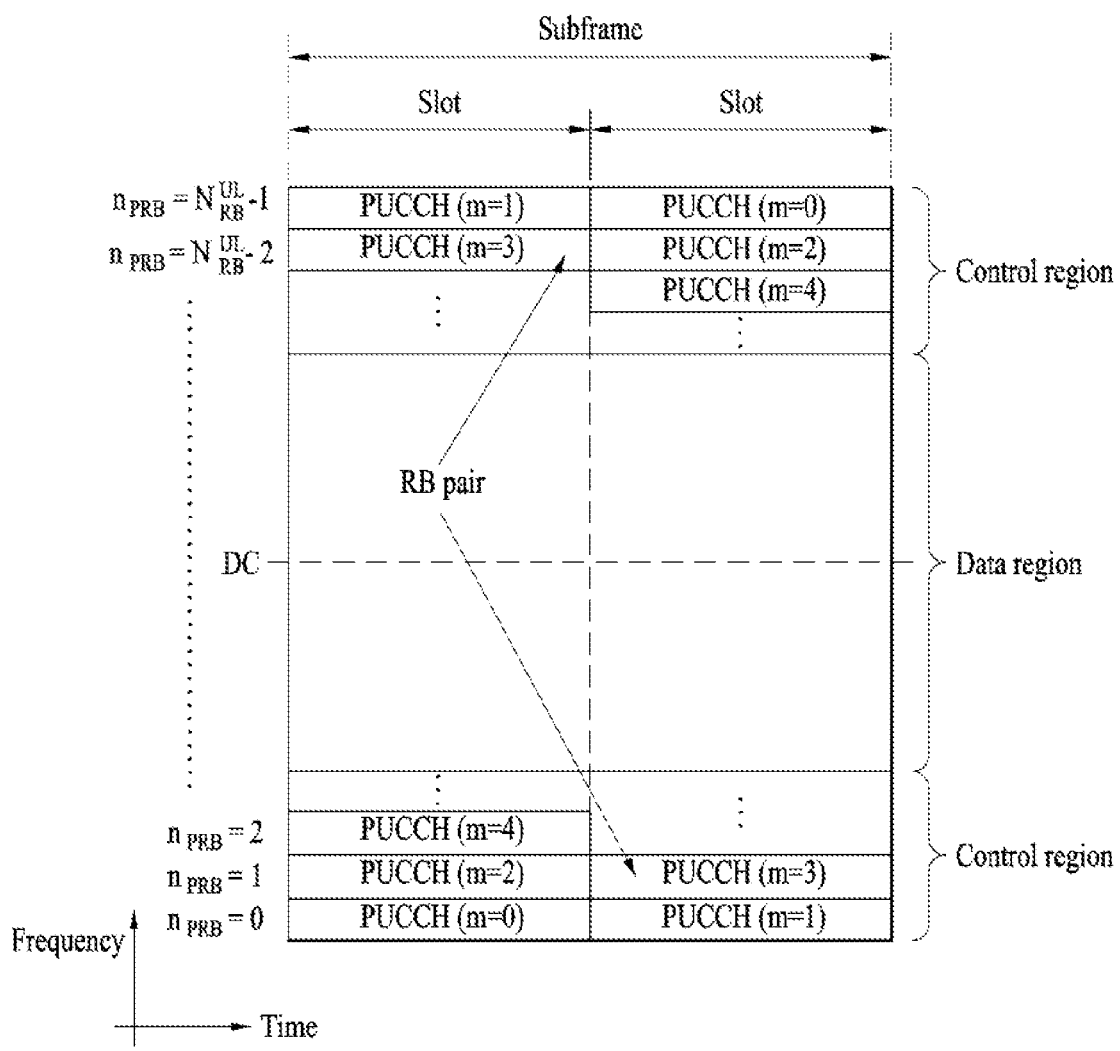
FIG. 5 illustrates the structure of a UL subframe used in the LTE/LTE-A based wireless communication system.

FIG. 5 illustrates the structure of a UL subframe used in the LTE/LTE-A based wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

The examples of the present invention can be applied to not only the 3GPP LTE/LTE-A system but also a new radio access technology (RAT) system. As a number of communication devices have required much higher communication capacity, the necessity of mobile broadband communication, which is much enhanced compared to the conventional RAT, has increased. In addition, massive MTC capable of providing various services anytime and anywhere by connecting a number of devices or things to each other has been considered as a main issue in the next generation communication system. Moreover, the design of a communication system capable of supporting services/UEs sensitive to reliability and latency has also been discussed. That is, the introduction of the next generation RAT considering the enhanced mobile broadband communication, massive MTC, Ultra-reliable and low latency communication (URLLC), etc. has been discussed. For convenience of description, the corresponding technology is simply referred to as a new RAT in this specification.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 6:
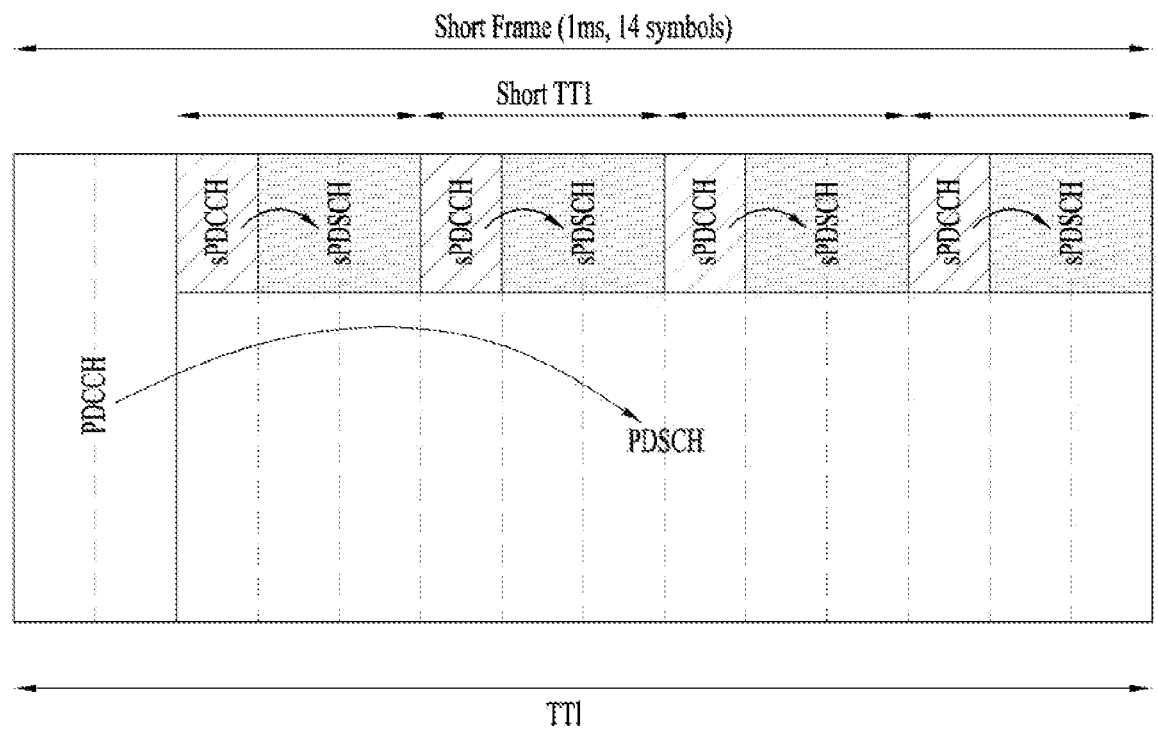
FIG. 6 illustrates an example of a short TTI and a transmission example of a control channel and a data channel in the short TTI.

FIG. 6 illustrates an example of a short TTI and a transmission example of a control channel and a data channel in the short TTI.

To reduce a user plane (U-plane) latency to 1 ms, a shortened TTI (sTTI) shorter than 1 ms may be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. The method of transmitting/receiving a signal in a TTI and an sTTI according to examples described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, referring to FIG. 6, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

In a new RAT (NR) system, a time unit in which a data channel may be scheduled may be referred to as other terms, for example, a slot, instead of a subframe. The number of slots in a radio frame of the same time length may differ according to a time length of a slot. In the present invention, the terms "subframe", "TTI", and "slot" are interchangeably used to indicate a basic time unit of scheduling.

<OFDM Numerology>

The new RAT system uses an OFDM transmission scheme or a similar transmission scheme. For example, the new RAT system may follow the OFDM parameters defined in the following table. Or although the new RAT system still use a legacy LTE/LTE-A numerology, the new RAT system may have a wider system bandwidth (e.g., 100 MHz). Or one cell may support a plurality of numerologies. That is, UEs operating with different numerologies may co-exist within one cell.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

<Subframe Structure>

Figure 7:
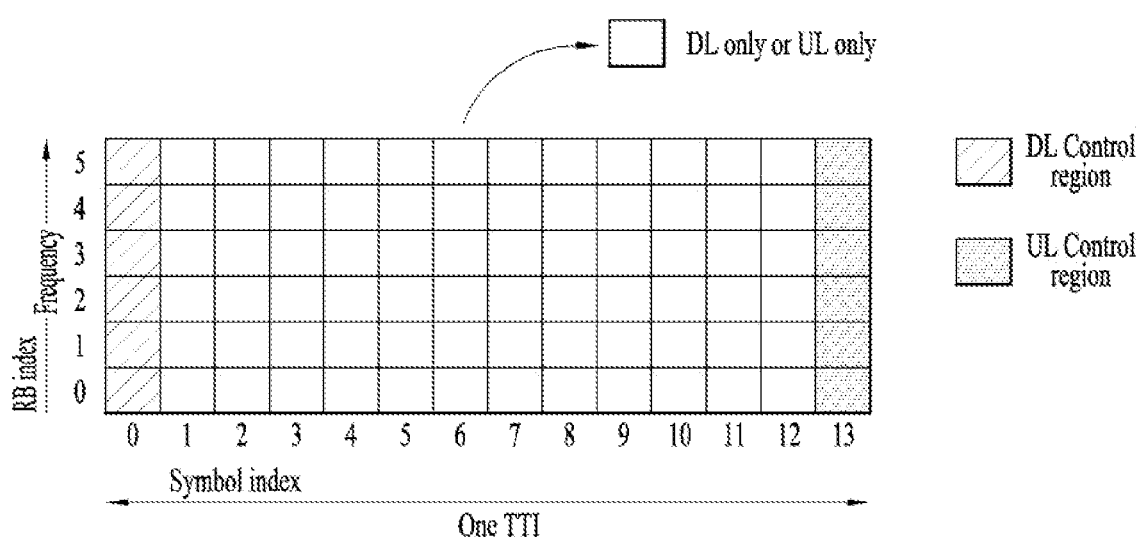
FIG. 7 illustrates a subframe structure.

FIG. 7 illustrates a new RAT (NR) subframe structure.

To minimize a data transmission delay, a subframe structure in which a control channel and a data channel are multiplexed in time division multiplexing (TDM) is considered in 5G new RAT.

In FIG. 7, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 7, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the self-contained subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a self-contained subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the self-contained subframe structure are set as a guard period (GP).

In a legacy LTE/LTE-A system, a DL control channel is TDMed with a data channel (refer to FIG. 4) and a PDCCH, which is a control channel, is transmitted throughout an entire system band. However, in new RAT, it is expected that a bandwidth of one system reaches approximately a minimum of 100 MHz. Therefore, it is difficult to distribute the control channel throughout the entire band for transmission of the control channel. For data transmission/reception of the UE, if the entire band is monitored to receive the DL control channel, this may cause increase in battery consumption of the UE and deterioration of efficiency. Accordingly, the present invention proposes a scheme in which the DL control channel can be locally transmitted or distributively transmitted in a partial frequency band in a system band, i.e., a channel band.

Figure 8:
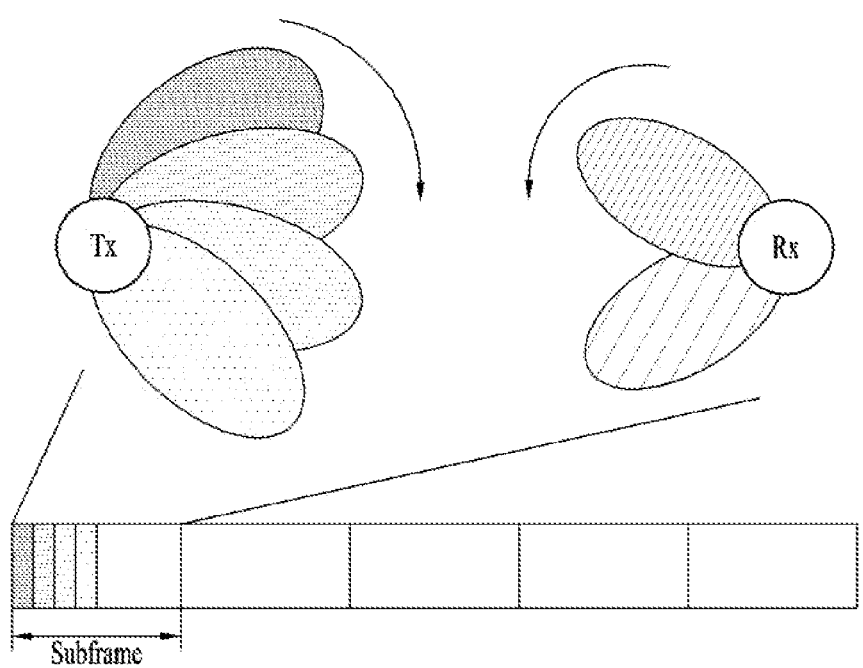
FIG. 8 illustrates an application example of analog beamforming.

FIG. 8 illustrates a transmission/reception method of a radio signal using an analog beam. Particularly, FIG. 8 illustrates a transmission/reception method of a radio signal by transmission/reception analog beam scanning.

Referring to FIG. 8, if an eNB transmits a synchronization signal in a cell or a carrier while switching beams, a UE performs synchronization with the cell/carrier using the synchronization signal detected in the cell/carrier and discovers a most suitable (beam) direction for the UE. The UE should be capable of acquiring a cell ID and a beam ID (corresponding to the beam direction) by performing this procedure. The UE may acquire signals, particularly, RS information, transmitted in the beam direction, for example, an RS sequence, seed information, and location, while acquiring the beam ID. The eNB may allocate a group ID to UEs that have acquired a specific beam ID, i.e., UEs capable of receiving a DL channel in a specific beam direction. Cell-common information may be temporally/spatially divided on a beam ID basis and then transmitted to the UE. The cell-common information may be transmitted to the UE by a beam ID common scheme.

Upon acquiring the beam ID in a cell, the UE may receive cell-specific information as beam ID or group ID specific information. The beam ID or group ID specific information may be information that UEs of a corresponding group commonly receive.

In the multi-beam environment, signal transmission repetition or beam sweeping for signal reception may be considered according to a Tx/Rx reciprocal capability of a transmission and reception point (TRP) (e.g., eNB) or a UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

The present invention proposes an initial access procedure, which becomes different in millimeter wave (mmWave) due to characteristics of analog beamforming, operations of the UE and the eNB according to the initial access procedure, and signaling information/schemes which should be transmitted between the UE and the eNB.

As mentioned previously, FIG. 7 illustrates a transmission scheme of a DL control channel through TDM with DL data or UL data in a broad band. In terms of the eNB, the eNB may transmit the DL control channel over the entire band, whereas, in terms of the UE, one UE may receive the DL control channel thereof in a partial specific band rather than the entire band. Herein, the DL control channel means a control channel carrying DL specific information such as DL scheduling, information about cell configuration that the UE should know, and UL specific information such as a UL grant, as control information that the eNB transmits to the UE.

Subcarrier spacings used in the NR system may support a plurality of subcarrier spacings (e.g., subcarrier spacings of 15 kHz, 30 kHz, 60 kHz, 120 kHz, and 240 kHz) having an integer multiple of (or $2^n$ times) a default subcarrier spacing, based on the default subcarrier spacing.

An operation that the UE should first perform to receive a service by being associated with a specific system is acquiring time and frequency synchronization of the system, receiving basic system information, and adjusting a UL timing on UL. This procedure is generally called the initial access procedure. The initial access procedure generally includes a synchronization procedure and an RACH procedure. A brief description of the synchronization procedure of the LTE/LTE-A system is as follows.

Primary synchronization signal (PSS): symbol timing acquisition, frequency synchronization, and cell ID detection within a cell ID group (three hypotheses).

Secondary synchronization signal (SSS): cell ID group detection (168 hypotheses), 10-ms frame boundary detection, and CP detection (two hypotheses).

Physical broadcast channel (PBCH) decoding: 40-ms timing detection, antenna configuration, system information acquisition, system bandwidth, etc.

That is, the UE acquires an OFDM symbol timing and a subframe timing through the PSS and the SSS, acquires a cell ID, and acquires essential information of a corresponding system by descrambling and decoding the PBCH using the cell ID.

It is expected that the NR system will support bands from a low frequency band of 700 MHz to a very high frequency band even up to 100 GHz. According to characteristics of each frequency band and requirements/characteristics of a service, different numerologies may be used in the NR system. In addition, different numerologies may be simultaneously multiplexed in the same system or subcarrier/subband. In this case, a numerology includes a subcarrier spacing, a (time) symbol length, a subframe length (or slot length), and/or a CP length.

The initial access procedure is an absolutely indispensable procedure when the UE connects to a network and multiple steps are involved in this procedure. The present invention proposes a random access procedure for the NR system, including PSS/SSS detection, PBCH and other system information decoding, and an RACH procedure.

In the NR system, at least two types of synchronization signals described below may be used.

1) NR-PSS for at least initial symbol boundary synchronization to an NR cell.

2) NR-SSS for detection of an NR cell ID or at least a part of the NR cell ID. The number of NR cell IDs aims to determine to be at least 504. The number of NR cell IDs may be determined to be equal or greater than the number of cell IDs (i.e., 504 cell IDs) in the LTE/LTE-A system. NR-SSS detection is based on a fixed time/frequency relationship with an NR-SSS resource location regardless of a duplex mode and a beam operation type in at least a given frequency range and CP overhead.

In addition, in the NR system, at least one broadcast channel (hereinafter, an NR-PBCH) may be used. NR-PBCH decoding is based on a fixed relationship with NR-PSS and/or NR-SSS resources regardless of the duplex mode and the beam operation type in at least a given frequency range and CP overhead. To carry essential system information, the following broadcasting schemes may be considered:

Option 1) The NR-PBCH carries a part of essential system information for initial access, including information needed when the UE receives a channel carrying the remaining essential system information.

Option 2) The NR-PBCH carries not only the information of Option 1 but also minimum information needed when the UE performs initial UL transmission (which is not limited to the NR-PBCH).

Option 3) The NR-PBCH carries all essential information for initial access.

In addition to the above options, other options may be used.

A. Initial Access Procedure

<A.1. Step 1: PSS/SSS Detection>

When different numerologies are supported in the same system or same carrier, a numerology used to transmit a synchronization signal is not fixed and may vary in the time domain or frequency domain. In this case, ambiguity may occur when the UE detects the synchronization signal. In consideration of this situation, the present invention proposes a numerology used to transmit the synchronization signal and a method of detecting the synchronization signal by the UE.

Fully Blind Detection on SS

A synchronization signal (SS) may be transmitted using the same numerology as a numerology used for data transmission in a corresponding band. Alternatively, the SS may be transmitted using one arbitrary numerology among numerologies that a system may support irrespective of the numerology used for data transmission in a corresponding band. In this case, the UE may blind-detect the SS. For example, if subcarrier spacings that the NR system may support are $\Delta f \in \{15\ \text{kHz}, 30\ \text{kHz}, 60\ \text{kHz}, 120\ \text{kHz}, \ldots\}$, the SS may be transmitted using one of the subcarrier spacings that the NR system may support. The UE may attempt to detect the SS in an arbitrary band using frequency raster thereof. The UE may attempt to blind-detect the SS with respect to an available subcarrier spacing at every frequency raster location and/or a CP length in each subcarrier spacing or attempt to sequentially detect the SS with respect to each subcarrier spacing candidate in a frequency range desired to be detected.

Detection in Given Set of SS Numerologies

To improve the performance of SS detection and reduce the complexity of the UE, a set of numerology candidates used for SS transmission may be preconfigured. For example, a numerology having a relatively large subcarrier spacing (SC) may be configured not to be supported in a very low frequency band (e.g., a band of 700 MHz) and a numerology having a relatively small subcarrier spacing may be configured not to be supported in a very high frequency band. Accordingly, a numerology set available for SS transmission may be defined in standardization with respect to each frequency range or each frequency band. For example, the numerology set available for SS transmission with respect to each frequency band may be defined as follows.

*Numerology candidates in frequency range from $f_n$ to $f_m$ MHz

1) Option a: $\{(SC_i, CP_i), i=0, 1, \ldots, N\}$.

The UE attempts to detect the SS based on given candidates of a subcarrier spacing and a CP. That is, the UE detects the SS under the assumption that the SS is transmitted using one of given numerologies in a specific frequency range.

2) Option b: $\{SC_i, i=0, 1, \ldots, N\}$, where a CP length is unknown. In this case, the UE blind-detects a subcarrier spacing first in given subcarrier spacing candidates and blind-detects the CP length.

A plurality of numerologies including a subcarrier spacing, a CP length, and a subframe length is supported in the NR system due to a wide range of frequencies and diversified use cases, service demands, and/or requirements. A subcarrier spacing for a PSS/SSS may differ in each frequency range according to frequency characteristics of frequency bands or this may depend on network choice. At least one subcarrier spacing for each SS may be predefined in a specification for a given frequency range. In a specific frequency range, the UE may assume that a PSS/SSS/PBCH in a corresponding band is transmitted using a predefined subcarrier spacing. However, when multiple subcarrier spacings are applied to the PSS/SSS in the NR system, the UE should blind-detect the PSS/SSS using different subcarrier spacings in an extremely wide range of frequencies, thereby causing UE implementation complexity, UE battery consumption, and greater network access latency. Therefore, a single subcarrier spacing (i.e., N=0) may be proper for each SS in a given frequency range.

Among numerologies defined/scheduled as candidates available for SS transmission in a corresponding frequency band, at least one numerology should be a numerology used for data transmission/reception in the corresponding frequency band.

While the PSS/SSS is transmitted omnidirectionally in the LTE/LTE-A system, a method is considered in which the eNB to which mmWave is applied transmits a signal such as the PSS/SSS/PBCH through beamforming while sweeping beam directions omnidirectionally. In this way, transmission/reception of a signal while sweeping beam directions is referred to as beam sweeping or beam scanning. For example, assuming that the eNB has a maximum of N beam directions, the eNB transmits the signal such as the PSS/SSS/PBCH in each of the N beam directions. That is, the eNB transmits an SS such as the PSS/SSS/PBCH in each direction while sweeping directions that the eNB may have or the eNB desires to support. Alternatively, when the eNB may form N beams, one beam group may be configured by grouping a few beams and the PSS/SSS/PBCH may be transmitted/received with respect to each beam group. In this case, one beam group includes one or more beams. A bundle of the PSS/SSS/PBCH per beam group is referred to as an SS block. In terms of SS transmission, the "SS block" is defined as a container for carrying the PSS, the SSS, the PBCH, and other system information in the NR system. That is, the SS block is made by a combination of SSs. Although at least one subcarrier spacing may be predefined with respect to the SS, it is necessary to discuss whether the PSS, the SSS, and the PBCH are to share the same subcarrier spacing. The SS may be broadly divided, as described above, into the PSS and the SSS according to a role thereof. If the UE performs blind detection (BD) for a numerology used for SS transmission, this may imply that the UE performs BD for a numerology used for PSS transmission because the UE should primarily detect the PSS first. The UE may detect an ID, which is a seed of a PSS sequence, (e.g., the ID means a cell ID in the legacy LTE system) or candidates of the ID by detecting the PSS and acquire coarse time/frequency synchronization. Next, the UE detects the SSS. In this case, a numerology used for SSS transmission may be different from a numerology used for PSS transmission. The following schemes may be used for numerologies used for PSS/SSS transmission.

*Option 1: The PSS and the SSS share the same numerology. In this case, the UE first detects the PSS and then detects the SSS using a numerology used for the PSS. Upon acquiring a subframe timing and a cell ID/beam ID using the SSS, the UE receives the PBCH in order to acquire system information. When necessary, particularly, when the eNB performs beam sweeping of the SS using analog beamforming, the eNB may cause the UE to obtain an accurate subframe timing of a corresponding cell by transmitting an extended SS (ESS). The PBCH means a channel carrying the most essential system information. A numerology used for PBCH transmission may be different from a numerology used for PSS/SSS transmission. This may be associated with beam management of a transmission and reception point (TRP). If a specific TRP desires to extend a large number of beam directions used for SS transmission and beam reference signal (BRS) transmission, i.e., if the specific TRP desires to show many beam directions to the UE, or if the number of beams that the TRP may have is larger than the number of (time) symbols constituting one subframe, the TRP may transmit the PSS/SSS having a wider subcarrier spacing and transmit the PBCH having a narrower subcarrier spacing than the subcarrier spacing of the PSS/SSS. Alternatively, when UEs are gathered at a specific location, when the TRP does not have to transmit the PSS/SSS in all beam directions, when only some (time) symbols are used for PSS/SSS transmission and other data, except for the PSS/SSS or a beam related signal (e.g., PBCH, BRS, etc.), should be transmitted in a duration of the remaining symbol(s), or when other reasons occur, a numerology and/or a time-frequency resource used for SS transmission may be different from a numerology and/or a time-frequency resource used for PBCH transmission. Hereinafter, a method of configuring numerologies of the SSS and the PBCH will be described.

1) Alt 1: The PBCH, the PSS, and the SSS share the same numerology. The UE uses a numerology obtained by detecting the PSS to decode the SSS and then decode the PBCH.

2) Alt 2: The PBCH has a numerology different from the PSS/SSS. The ESS which may be additionally defined and the SSS may indicate a numerology used by the UE to receive the PBCH. In this case, a numerology value used for the PBCH among numerology candidate sets available for PSS BD may be indicated. If a numerology set available for PSS transmission is $\{a, b, c, d, \ldots\}$ (where each of a, b, c, d, . . . denotes a numerology including a subcarrier spacing, a CP length, etc.), a numerology set available for PBCH transmission should be a subset of the numerology set and, for example, one of $\{a, b\}$ may be a numerology value available for PBCH transmission. In this case, the SSS or the ESS may indicate a or b. The UE receives/decodes the PBCH using a numerology value indicated by the numerology of the PBCH. Herein, the UE may assume that a DL data channel and/or control channel immediately after receiving the PBCH uses the same numerology as the numerology used for the PBCH.

<A.2. Step 2: PBCH Decoding>

The UE acquires time and frequency synchronization and cell ID information by detecting the PSS and the SSS. The next step is acquiring essential system information (SI) to access the network. In the NR system, the essential SI which is absolutely necessary for the UE to access the network is referred to as minimum system information (or Min. SI). The most essential information out of the Min. SI is transmitted on the PBCH and the other Min. SI is not transmitted on the PBCH (this is referred to as the remaining Min. SI (RMSI)). Only when the UE receives up to the RMSI, the UE may access the network by performing a random access procedure.

In other words, in the NR system, at least one broadcast channel (hereinafter, a PBCH) may be defined and the PBCH may be used to carry the absolutely essential SI (i.e., a part of the Min. SI). After acquiring synchronization of the network and the cell ID, the UE is ready to decode the PBCH.

A subcarrier spacing predefined in a communication specification for a specific frequency range is referred to as a reference numerology or a default numerology for an SS. For the reference numerology within a specific frequency range, multiple candidates for the subcarrier spacing may also be predefined in the specification. For example, a subcarrier spacing of an SS/PBCH for frequencies below 6 GHz may be 15 kHz and a set of subcarrier spacing candidates for data transmission, such as {3.75 kHz, 15 kHz, 30 kHz, 60 kHz}, may be predefined. If 60 kHz is used as the SS/PBCH subcarrier spacing for a frequency range above 6 GHz, a set of subcarrier spacing candidates for a data subcarrier spacing may be, for example, {15 kHz, 30 kHz, 60 kHz, 120 kHz} and this may be specified by a communication specification. That is, the default numerology for the SS/PBCH is defined or determined per frequency range and a set of numerology candidates for (UL/DL) data is mapped per default numerology for the SS/PBCH (or a frequency range). The default numerology for the SS/PBCH may be equal to the default numerology for the (UL/DL) data. Alternatively, the default numerology for the (UL/DL) data may be tied to the default numerology for the SS/PBCH.

As described above, the PBCH will be transmitted within an SS block and the subcarrier spacing of the PBCH may conform to the subcarrier spacing of the SS. Since information bits/field composition will be fixed within the PBCH, although all of the Min. SI cannot be transmitted on the PBCH, a part of the Min. SI may be transmitted on the PBCH and the rest (i.e., RMSI) of essential Min. SI (i.e., minimum SI) for initial access may be transmitted on other channels. The PBCH may signal where/when/how the remaining Min. SI (hereinafter, RMSI) can be acquired.

The PBCH of NR (i.e., NR-PBCH) may carry a part of the Min. SI including configuration/scheduling information for the RMSI and other SI. A part of the Min. SI is included in the NR-PBCH. The RMSI is transmitted on other channels and the NR-PBCH may provide configuration/scheduling information about the RMSI so that the UE may receive the RMSI.

An issue is how to deliver the RMSI. There may be a few options for delivering the RMSI. For example, a new channel may be defined as a second PBCH (hereinafter, an sPBCH) for delivering the RMSI or the RMSI may be delivered within a data channel. If the PBCH is transmitted through beam sweeping, the RMSI should be transmitted through beam sweeping because the Min. SI is essential information when the UE accesses the network. If NR defines a new channel for delivering the RMSI, i.e., the sPBCH, the sPBCH may be multiplexed within the SS block. Alternatively, another round of beam sweeping for sPBCH transmission may be required although such a round may cause network inefficiency. Notably, while the sPBCH may provide a limited level of MCSs, use of the sPBCH to deliver the Min. SI may damage system flexibility for NR because the sPBCH should always be reserved for RMSI transmission.

For system flexibility, the present invention proposes transmitting the RMSI on a PDSCH. The PDSCH carrying the RMSI may be transmitted in units of a mini-slot in the time domain in consideration of a beam sweeping operation for the RMSI. That is, mini-slot based beam sweeping may be applied to RMSI delivery. Since it is a heavy burden on the UE to perform BD for a control search space in every mini-slot in order to receive the RMSI, the network should provide information as to when the RMSI is to be delivered. To provide timing information of control information for the RMSI, a specific time (e.g., a slot index) indication may be provided by the NR-PBCH. Alternatively, an implicit offset for the control information or an offset for a search space in which the UE should search for the control information may be known to the UE based on an NR-PBCH transmission time index (e.g., a slot index and/or an SS block index). In terms of signaling for a time instance for a control resource, the network may signal a time window in which UE(s) are to monitor the control resource for the RMSI.

To receive SI, NR may configure a non-UE dedicated search space for control channels, which may be SS block-specific or UE group-specific. A search space set may be predefined by a communication specification and the NR-PBCH may signal specific set(s) of a search space for the RMSI. If the RMSI is provided through the PDSCH, a numerology of the search space for the RMSI, particularly, a subcarrier spacing, should be identical to a numerology of the PDSCH carrying the RMSI. Each system of the present invention may have a default subcarrier spacing for a PDCCH/PDSCH/PUSCH/PUCCH and the default subcarrier spacing may be provided through a broadcast channel such as the PBCH or predefined in every frequency range by the communication specification. The subcarrier spacing for the RMSI may conform to the default subcarrier spacing for the PDCCH/PDSCH. The meaning of "the PBCH indicates the subcarrier spacing for the RMSI" may imply that the PBCH indicates a subcarrier spacing for data among a plurality of numerologies supported by the system/cell. If the PBCH indicates the subcarrier spacing for the RMSI, the subcarrier spacing for data may be immediately applied after the PBCH is decoded. Otherwise, the UE may be aware of the subcarrier spacing for data only after receiving an RAR at the earliest.

Other SI may be transmitted in a similar manner to a scheme of the above-described RMSI.

<A.3. Step 3: RACH Procedure>

Upon receiving essential SI (i.e., Min. SI), the UE is ready to attempt to perform UL synchronization. Similarly to an SS such as a PSS, an SSS, or a PBCH, a numerology for an RACH procedure should be determined. Considering a target scenario and coverage requirements, since a numerology for a PRACH is different from a numerology for data, a numerology for PRACH preamble transmission is different from a numerology for SSs or data. Details of RACH numerology need to be signaled by SI. Hereinafter, an RACH resource numerology will be discussed first in terms of a resource unit, i.e., the size of a time-frequency block considering multiplexing of an RACH resource and data.

A.3.1. PRACH Resource Configuration

For convenience of description, a time/frequency resource on which RACH message(s) are transmitted will hereinafter be referred to as an RACH resource. The RACH resource may further be defined as a UL RACH resource and a DL RACH resource. PRACH preamble and, possibly, UL RACH message 3 such as Msg3 may be transmitted on the UL RACH resource. RAR and, possibly, DL RACH message 4 such as Msg4 may be transmitted on the DL RACH resource. Basically, the RACH resource conforms to the size of a time/frequency resource of an SS block and an SS burst. Alternatively, the size and location information on the time/frequency of the RACH resource are included in PRACH configuration.

Figure 9:
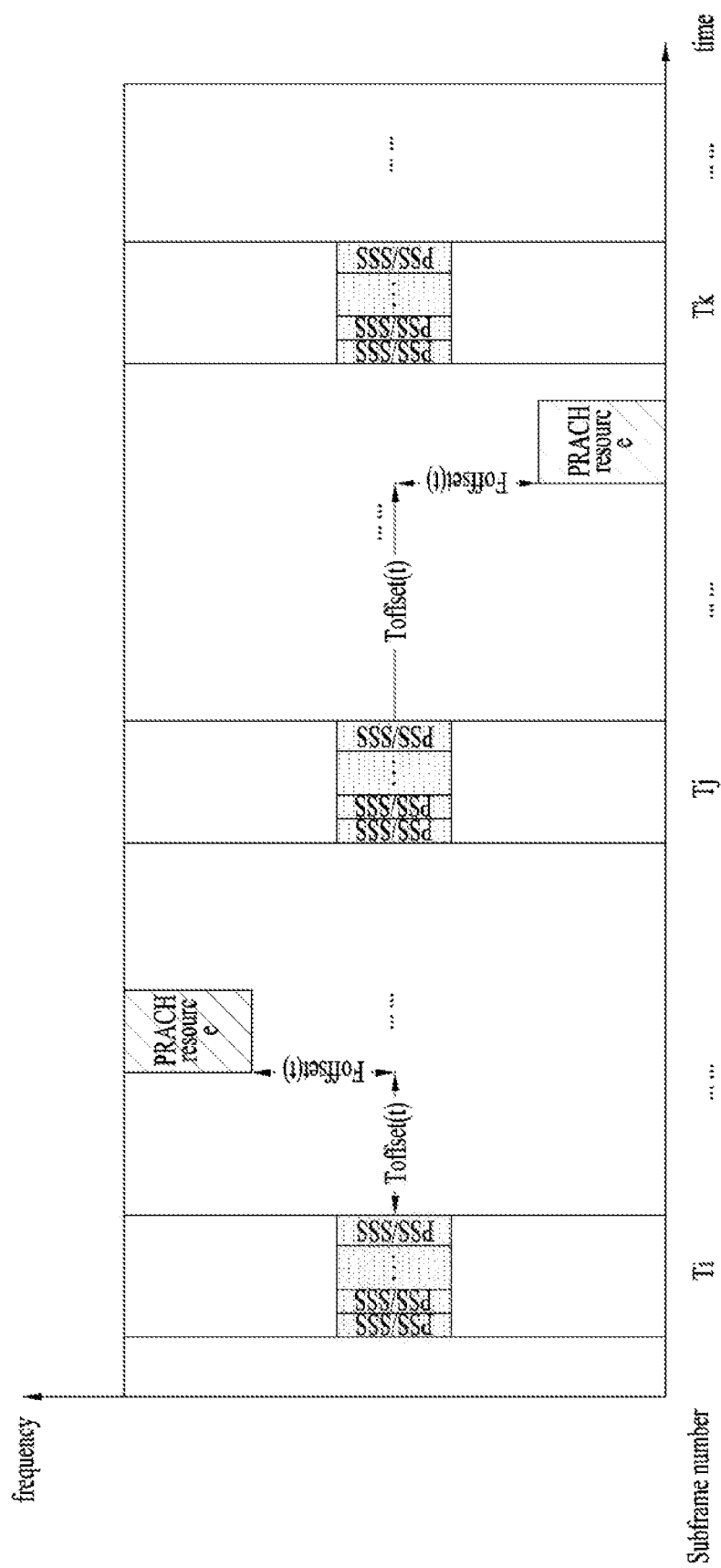
FIG. 9 illustrates a time-frequency resource of a random access channel according to the present invention.

FIG. 9 illustrates a time-frequency resource of a random access channel according to the present invention. Particularly, FIG. 9 illustrates an example of cell-specific and implicit PRACH resource configuration.

Although the network/eNB may explicitly inform the UE of a PRACH time-frequency resource on which the UE can transmit a PRACH, the PRACH time-frequency resource may be implicitly tied to a resource on which an SS is transmitted so as to cause the UE to implicitly be aware of the location of the PRACH time-frequency resource. For example, referring to FIG. 9, the time resource of the PRACH may be placed at a specific offset from a time resource on which the SS is transmitted and the frequency resource of the PRACH may be placed at a specific offset from a location at which the SS is transmitted (i.e., a location detected by the UE). In FIG. 9, Toffset(t) may be a function of a subframe or slot number in which the SS is transmitted, i.e., a time at which the SS is transmitted, and a cell ID detected by the UE through the SS. Similarly, in FIG. 9, Foffset(t) may be a function of a subframe or slot number in which the SS is transmitted, i.e., a time t at which the SS is transmitted, and/or a frequency in which the SS is transmitted, and a cell ID detected by the UE. In other words, Toffset(t)=Function(t, cell ID) and Foffset(t)=Function(t, f, cell ID).

In this way, the PRACH resource may be cell-specifically configured. The UE may derive the PRACH frequency resource using the function of the time/frequency resource on which the SS is transmitted and the cell ID detected by the UE. For example, a corresponding PRACH time/frequency offset value may be a function of the cell ID. When the SS such as a PSS/SSS is transmitted in a plurality of beam directions, a cell-specific PRACH resource may be configured beam-commonly or beam-specifically. For example, the PRACH resource may be beam-commonly configured by tying the time resource of the PRACH resource to a subframe (or slot) in which the SS is transmitted. For example, if a subframe number in which the SS is transmitted is t, the time resource of the PRACH resource may be beam-commonly configured by Toffset(t)=Function (t, cell ID). Alternatively, the PRACH resource may be beam-specifically configured by tying the time resource of the PRACH resource to a (time) symbol in which the SS is transmitted. For example, when a symbol unit in which a beam is transmitted (e.g., a subframe number or a symbol number) is t, the time resource of the PRACH resource may be beam-specifically configured by Toffset(t)=Function(t, cell ID).

In PRACH resource configuration, PRACH preamble/sequence related information such as a PRACH preamble index, preamble transmission power, and an RA-RNTI, in addition to the PRACH time-frequency resource, may be transmitted on the PBCH. In other words, PRACH resource configuration related information may be transmitted as essential SI. Candidates of the essential SI that can be transmitted on the PBCH may include information about a numerology used to receive a DL/UL data/control channel in addition to the PRACH configuration related information. Since DL/UL frequency bands may differ, the PBCH may transmit DL/UL system bandwidth information and transmit a numerology used for UL data/control channel transmission, i.e., a subcarrier spacing, a CP length, a subframe length, a symbol length, or the number of symbols constituting a subframe, as well as a numerology used for DL data/control channel reception.

A.3.2. RACH Procedure

Figure 10:
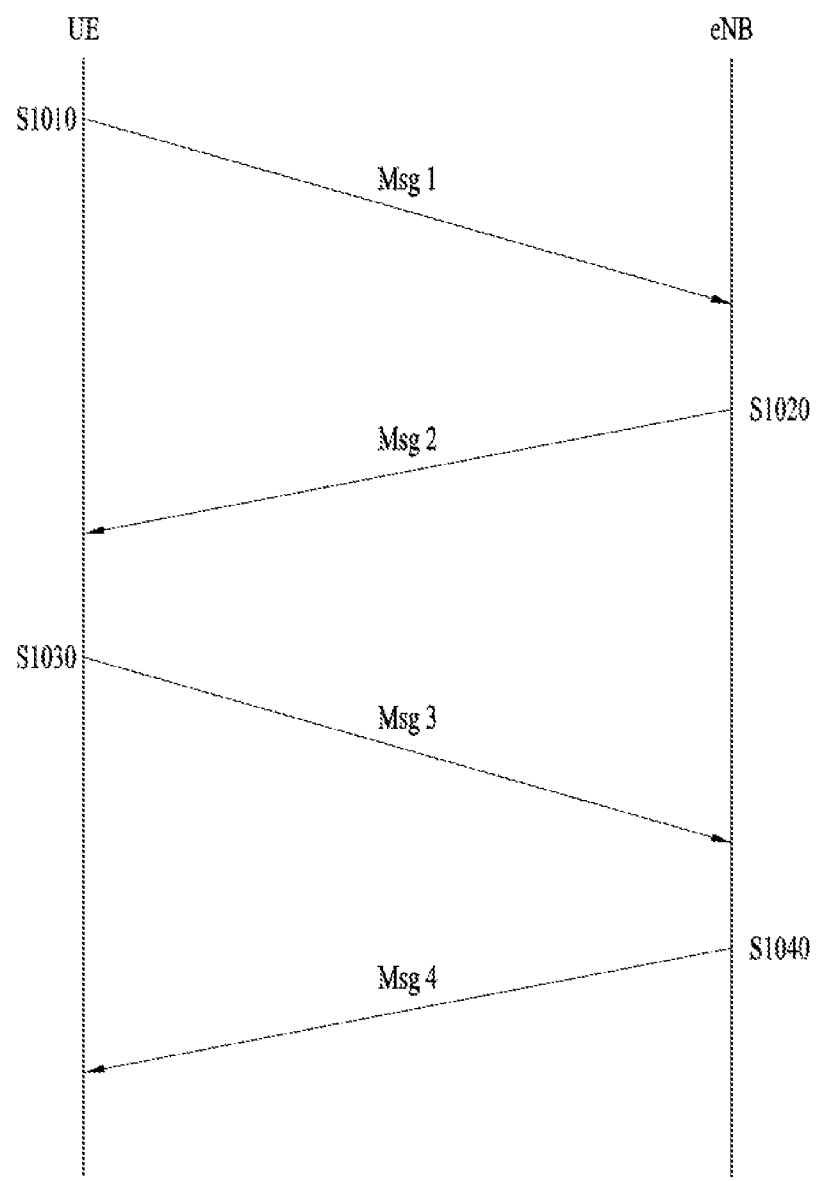
FIG. 10 illustrates an RACH procedure.

FIG. 10 illustrates an RACH procedure.

Hereinafter, an RACH procedure of the UE for detecting an SS such as a PSS/SSS to acquire DL time/frequency synchronization and a cell ID and then receiving a PBCH to acquire UL synchronization will be described. As described with reference to FIG. 3, the RACH procedure in LTE/LTE-A broadly includes 4-step message exchange.

1) S1010. Msg1 (UE to eNB): A random access preamble on an RACH on UL.

2) S1020. Msg2 (eNB to UE): An RAR including a UL grant about a DL-SCH, a temporary UE ID, and a TA command.

3) S1030. Msg3 (UE to eNB): First scheduled UL transmission on a UL-SCH. UE ID transfer.

4) S1040. Msg4 (eNB to UE): Contention resolution on DL (a UE ID is echoed).

RRC connection establishment.

If the RACH procedure is ended, the UE is connected to a corresponding cell.

The RACH procedure of the NR system for which a plurality of different use cases and/or a plurality of numerologies can be used needs to be differentiated from the RACH procedure of the legacy LTE/LTE-A system.

Upon acquiring the DL synchronization and the cell ID by detecting the SS, the UE may acquire PRACH configuration information through PBCH reception and acquire information about the PRACH resource as mentioned above in Section A.3.3. Then, the UE may transmit a PRACH preamble on the PRACH resource using the PRACH configuration information.

When the UE transmits the PRACH preamble, i.e., when the UE transmits message 1 (Msg1), the following information is transmitted together with Msg1. As another scheme, the following information may be transmitted after message 3 (Msg3) is transmitted or RRC connection setup is performed.

A service type, a use case (mMTC, eMBB, and/or URLLC), and/or a supported subcarrier spacing.

Preferred beam index(es) and/or BRS port number(s).

Information about the service type and/or the use case and information about the supported subcarrier spacing may be reported in a combined format. In addition, information about a plurality of service types and/or a plurality of use cases or a plurality of supported subcarrier spacings may be transmitted. If the UE supports a plurality of service types and/or a plurality of use cases or a plurality of supported subcarrier spacings, the UE may transmit information about a service type and/or a use case that the UE desires to receive most preferentially and priority information about the supported subcarrier spacings. Even when the UE supports a plurality of service types and/or a plurality of use cases, only a service and a subcarrier space that the UE desires to preferentially receive may be requested.

As a response to the PRACH message 1 (Msg1), a TRP may transmit an RAR and the RAR message transfers a temporary RNTI (T-RNTI) and then time/frequency information through which the UE can transmit Msg3. The RAR is a message transmitted as a response to Msg1 of the UE. The TRP transmits the RAR in consideration of information about a service type and/or a use case, or a supported subcarrier spacing that the UE has reported through Msg1. A method of considering the information about the service type, the use case, and/or the subcarrier spacing in the RAR may be as follows. A method described hereinbelow may be used for a normal RACH procedure even though the method is not for the purpose of additionally considering the service type, the use case, and/or the subcarrier spacing.

*Option A.3.2-1

RACH Msg1 including information about a requested service type, use case, and/or subcarrier spacing may be transmitted and the TRP transmits an RAR in consideration of this information. An RAR including UL grant information for allocating a UL resource on which Msg3 for a specific RACH preamble sequence can be transmitted may be transmitted on a DL shared channel. When the UE allocates the UL resource on which Msg3 can be transmitted, the TRP allocates the resource in a band to which the subcarrier spacing, the service type, and/or the use case requested by the UE is applied. In addition, the TRP transmits information about a numerology available for Msg3 transmission by the UE as well.

If the subcarrier spacing, the service type, and/or the use case requested by the UE are not applied at a corresponding timing in a corresponding system, the TRP may command the UE to transmit Msg3 using a numerology used for SS transmission or a numerology used for PRACH (Msg1) transmission. When the UE does not support a numerology indicated by an RAR to be used for Msg3 transmission, the UE automatically transmits Msg3 using the numerology used for SS transmission in a corresponding band or the numerology used for PRACH (Msg1) transmission.

Alternatively, when UL grant information is transmitted through the RAR, the TRP may designate a numerology (e.g., a subcarrier spacing) which is to be used on a corresponding resource together with information about a UL time/frequency resource on which Msg3 is to be transmitted with respect to each preamble sequence, i.e., each UE. In addition, timing advance (TA) information is transmitted in the RAR and the TRP may transmit a different TA value according to subcarrier spacing. For example, if the TA is 2 $T_s$ based on a subcarrier spacing of 15 kHz, then a TA value in a band in which a subcarrier spacing of 30 kHz is used is 4 $T_s$. To transmit Msg3, the UE receives a UL resource allocated in a carrier or a subband to which the subcarrier spacing, service type, and/or use case requested thereby is applied. If a UE ID is separately managed with respect to each carrier or each use case, a temporary UE ID for transmitting Msg3 may also be received in the corresponding carrier or subband. The UE may receive an allocated C-RNTI in Msg4 in which contention resolution occurs and the C-RNTI may also be allocated with respect to each use case.

Although the UE has transmitted Msg1, if the UE fails to receive the RAR, the UE may repeatedly attempt to transmit Msg1 on a PRACH resource. A UE that transmits Msg3 by moving to a carrier suitable for a subcarrier spacing, a service type, and/or a use case desired thereby after receiving the RAR, a UE that fails to successfully receive Msg4, or a UE that has not succeeded in connection because the UE is not finally selected after contention resolution may perform the following operations.

1) Alt 1: The UE may reattempt to transmit RACH Msg1 on a PRACH resource on which a PRACH has first been transmitted.

2) Alt 2: In preparation for the above-mentioned cases, the TRP may allocate a plurality of UL resources for Msg3 transmission (in each carrier). For example, if the UE fails to successfully receive Msg4 or the UE has not succeeded in connection because the UE is not finally selected in contention resolution, the UE may attempt to transmit Msg3 using a UL resource allocated for Msg3 transmission.

*Option A.3.2-2

If a subcarrier spacing, a service type, and/or a use case of the UE is transmitted through RACH Msg1, contention with other UEs may be problematic. As another method considering the subcarrier spacing, the service type, and/or the use case of the UE, which is different from Option A.3.2-1, Option A.3.2-2 causes the UE to transmit an RACH in Msg1 and the TRP to transmit an RAR in Msg2 similarly to a legacy LTE RACH procedure. In addition, the UE may report information about the subcarrier spacing, the service type, and/or the use case to the TRP in Msg3. A plurality of information may be reported and information about each subcarrier spacing, each service type, and/or each use case may be transmitted in Msg4. That is, even when the TA value has been transmitted in Msg2, the TA value may be additionally transmitted according to a numerology, resource information/carrier information to which a specific use case is applied may be transmitted, and an additional C-RNTI may be allocated to the UE in each carrier through Msg4. In other words, the C-RNTI per use case or per carrier may be allocated. Upon receiving information about Msg4, the UE may receive a service by moving to a specific carrier or through retuning according to a subcarrier spacing, a service type, and/or a use case desired thereby. If the UE should receive a service by moving to a carrier, for example, if the UE moves to a partial carrier or a subband of a system band although the UE adjusts coarse synchronization by receiving an SS of the system band, the TRP may additionally inform the UE of RS information needed when the UE performs fine synchronization, particularly, tracking RS information, and dedicatedly inform the UE of a resource on which the UE can transmit a simple RACH for UL tuning in a corresponding carrier. If the UE performs an RACH procedure from the beginning in order to adjust UL synchronization, since overhead greatly increases, the TRP informs the UE of a dedicated resource for the simple RACH. This information may be transmitted in Msg4. The simple RACH means a signal that the UE transmits to adjust UL synchronization in a connected state and only the TA command may be transmitted in the RAR that the UE receives as a response to the simple RACH. The simple RACH may be transmitted using an RACH subcarrier spacing tied to a subcarrier spacing indicated for data transmission in Msg4.

A.3.3. PRACH Numerology

When the UE transmits PRACH Msg1 in a PRACH time-frequency, if a default numerology of a system has been defined, the UE may transmit PRACH Msg1 using the default numerology. Transmitting PRACH Msg1 using the default numerology implies that RACH Msg1 is transmitted using an RACH Msg1 numerology associated with the default numerology. Herein, a representative example of the numerology may be, particularly, a subcarrier spacing. For example, RACH Msg1 in a band using a subcarrier spacing (SC) of 15 kHz as the default SC may be transmitted using an SC of 1.25 kHz and RACH Msg1 in a band using an SC of 30 kHz as the default SC may be transmitted using an SC of 2.5 kHz.

Specific parameter sets may be defined according to transmission bandwidth for an SS of NR (hereinafter, an NR-SS) and the default SC. For example, the following parameter sets may be associated with the default SC and a maximum possible transmission bandwidth for the NR-SS.

Parameter set #W associated with an SC of 15 kHz and an NR-SS transmission bandwidth not greater than 5 MHz.

Parameter set #X associated with an SC of 30 kHz and an NR-SS transmission bandwidth not greater than 10 MHz.

Parameter set #Y associated with an SC of 120 kHz and an NR-SS transmission bandwidth not greater than 40 MHz.

Parameter set #Z associated with an SC of 240 kHz and an NR-SS transmission bandwidth not greater than 80 MHz.

*PRACH Sequence Length

When reuse/re-farming of LTE deployment is considered, it is better to use a PRACH preamble of a long sequence in order to support wide cell coverage and a sufficient number of preambles within wide cell coverage. Accordingly, it is better to support a PRACH preamble of a long length in NR in a frequency band at least below 6 GHz.

The followings are considered in designing a PRACH sequence.

A high Doppler frequency offset for high-speed requirements (a maximum of 500 km/h).

Unified design of FDD and TDD slot structures.

A beam scanning operation of a PRACH preamble when beam correspondence does not hold at a gNB.

As mentioned previously, an RACH preamble of a long sequence may be supported in an NR in a band below 6 GHz to support wide coverage. Meanwhile, according to requirements of the NR system, since a maximum mobile speed to be supported is about 500 km/h, a PRACH sequence of a short length may be introduced to provide robustness of a Doppler frequency offset. That is, although a short sequence has great usefulness in a band above 6 GHz, the short sequence needs to be supported even in a band below 6 GHz to support a very high speed of 500 km/h. As described above, in order for the gNB to support a dynamic TDD and beam scanning operation in a band above 6 GHz, NR may support the PRACH sequence of a short length and repetition may be introduced for the beam scanning operation and/or energy accumulation. For example, when the short sequence is used, the PRACH sequence is desirably configured by repetition of short sequence(s). In this case, CP overhead is not needed between repeated sequences. For the RACH preamble, multiple sequence lengths per band may be used in a band at least below 6 GHz.

Figure 11:
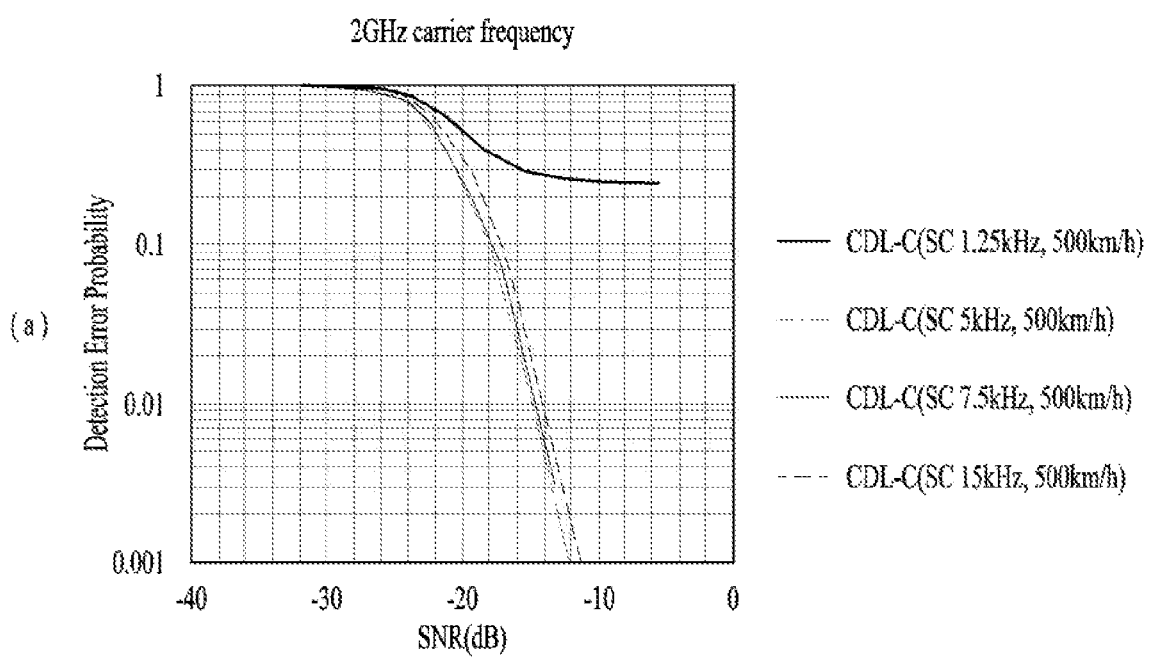
FIG. 11 illustrates a performance effect of Doppler frequency spread according to subcarrier spacing.
Figure 11:
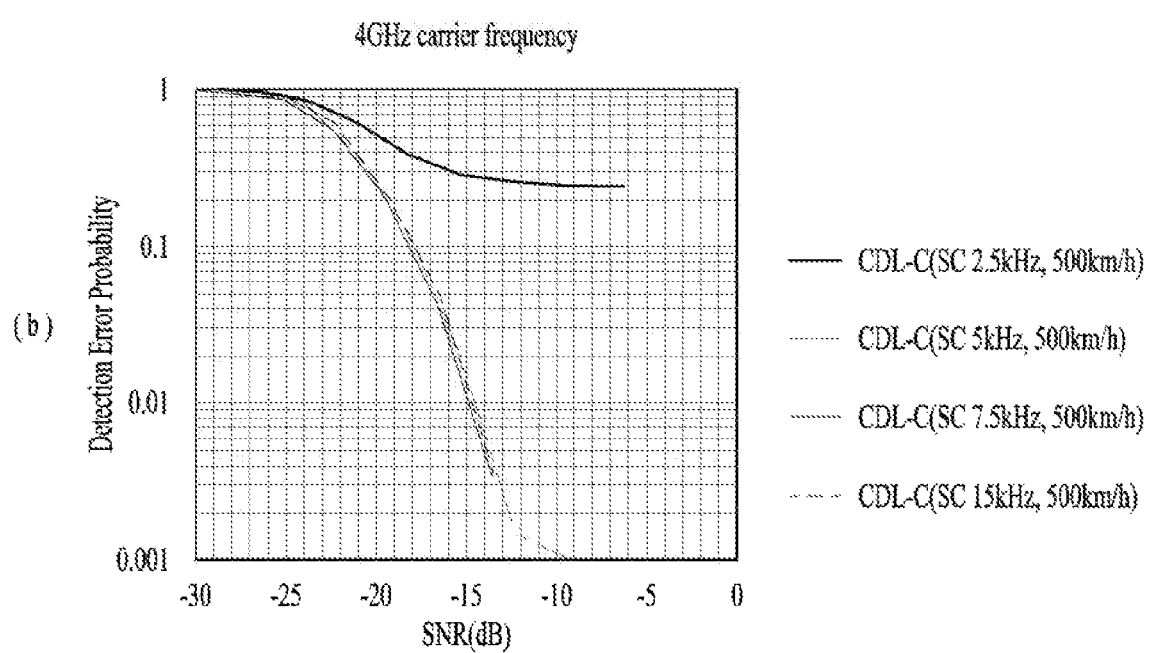

FIG. 11 illustrates a performance effect of Doppler frequency spread according to SC. Particularly, FIG. 11 illustrates simulation results of evaluating the performance effect of Doppler frequency spread according to sequence length (i.e., SC) at a speed of 500 km/h. In FIG. 11, CDL-C represents a clustered delay line-C.

According to the simulation results, an SC of an RACH preamble should be greater than at least 5 kHz to protect a UE having the highest speed. FIG. 11 shows that the performance levels of PRACH sequences having SCs of 5 kHz, 7.5 kHz, and 15 kHz are similar to each other at a speed of 500 km/h and may have freedom to select an SC of a PRACH sequence. Assuming that these three candidate SCs provide similar performance levels, it is better to determine an SC for an RACH preamble sequence in consideration of the dynamic TDD and/or beam scanning operation at the gNB, system overhead, system flexibility, and/or efficiency. The PRACH sequence of 5 kHz may be inefficient in terms of overhead consumed for the beam scanning operation and support of dynamic TDD. Since 5 kHz is the least among the three SCs, i.e., 5 kHz, 7.5 kHz and 15 kHz, the RACH preamble of an SC of 5 kHz is longest in the time domain and thus time used for RACH transmission increases. In addition, since the gNB should allocate an RACH resource for multiple reception beams, the amount of necessary resource allocation increases relative to other SCs. Therefore, using of an SC of 7.5 kHz for the PRACH sequence may be considered. Meanwhile, if the PRACH sequence is too short in the time domain, for example, if an SC is 15 kHz, the number of codes may be insufficient. In consideration of this situation, an SC of 7.5 kHz may be used for a short sequence of the RACH preamble in a frequency band supporting an SC of 15 kHz of the NR-SS. For example, in the case of a carrier frequency below 4 GHz, 7.5 kHz may be used as an SC for a short RACH preamble sequence. A default numerology may representatively refer to a numerology used to transmit an SS and a PBCH. As mentioned above, the default numerology may be referred to as the reference numerology. The default numerology may be defined with respect to each frequency band or each frequency range. Broadly, an SC of 15 kHz or an SC of 30 kHz may be defined below 6 GHz based on 6 GHz as a default SC of SS/PBCH transmission and an SC of 120 kHz or an SC of 240 kHz may be defined above 6 GHz as the default SC of SS/PBCH transmission. In detail, the SC of 15 kHz may be used in a band below 3 GHz, the SC of 30 kHz may be used in a band above 3 GHz and below 6 GHz, the SC of 120 kHz may be used in a band above 6 GHz and below a predetermined band, and the SC of 240 kHz may be used in a band above the predetermined band. Therefore, in order to detect the SS in a specific band, the UE may attempt to detect the SS using the default SC defined for SS transmission in the corresponding band. The UE may receive the SS/PBCH and receive minimum SI including RACH configuration. An SC for RACH Msg1 transmission may also be tied to an SC of the SS/PBCH. For example, when the SC of the SS/PBCH is 15 kHz, the SC of RACH Msg1 may be set to 1.25 kHz and, when the SC of the SS/PBCH is 30 kHz, the SC of RACH Msg1 may be set to 2.5 kHz. When the SC of the SS/PBCH is 120 kHz, the SC of RACH Msg1 SC may be set to 10 kHz and, when the SC of the SS/PBCH is 240 kHz, the SC of RACH Msg1 may be set to 20 kHz. Notably, if the gNB transmits the SS/PBCH through multiple beams, beam correspondence of the gNB may not be supported or the (time) symbol length of an RACH Msg1 sequence, i.e., the (time) symbol length of an RACH preamble, needs to be reduced to be repeatedly transmitted in the time domain in order to support a high-speed UE. For this purpose, the symbol length of the RACH preamble may be reduced by widening the SC of the RACH preamble. Typically, if the SC of the RACH preamble is widened, the frequency size of the RACH preamble is extended in proportion to the size of a subcarrier. However, for the efficiency of a radio resource, it is difficult to indefinitely increase the size of an RACH resource. Accordingly, if the frequency size of the RACH resource is limited, the length of an RACH preamble sequence decreases as the SC of the RACH preamble increases. If the gNB performs beam sweeping to receive RACH Msg1, the UE may perform repeated transmission using a frequency resource of RACH Msg1, i.e., a frequency resource such as the RACH preamble. If the SC of RACH Msg1 is small, since a long sequence occupying a time of 1 ms should be repeatedly transmitted, overhead increases and a channel characteristic may differ according to time. Therefore, it is efficient to repeatedly transmit an RACH sequence having a wide SC and a short time length. Since energy is collected when a signal is transmitted for a long time and then coverage will be extended, a long sequence is needed for coverage extension. Accordingly, unlike legacy LTE that supports only an RACH preamble of a long sequence spanning a subframe of a 1-ms time length, transmission of RACH Msg1 in a repeated form of a short sequence may be supported in NR in addition to the preamble of a long sequence. To this end, a plurality of RACH Msg1 numerologies is defined with respect to one default SC. As described previously, a sequence having an SC of 7.5 kHz may be considered as an RACH sequence candidate of a short sequence. Consequently, a plurality of PRACH sequences may be mapped to one default SC. For example, a long RACH sequence and a short RACH sequence may be defined with respect to one UL default SC.

Unless additionally signaled, a DL default numerology and a UL default numerology may be set to be equal. For example, when the TRP informs the UE of RACH configuration information, the unit of an RACH resource for RACH transmission is configured based on DL-UL default numerologies. That is, a UL RACH resource is configured based on a DL slot length and a DL symbol length.

If a DL numerology is different from a UL numerology, for example, if a numerology available for SS/PBCH transmission is different from a numerology of a UL RACH resource and PUSCH scheduling (at least Msg3), a UL slot length should be particularly indicated by SI. That is, the relationship between the UL slot length, slot indexes allocated as the RACH resource, and DL slots/indexes should be provided by the SI. The UE may be accurately aware of the location of the RACH resource through the SI. However, if no additional signaling is given, the UE may assume that the DL slot length is equal to the UL slot length. In addition, the network may transmit RACH resource configuration information under the assumption that the UL slot length is identical to the DL slot length.

The following table lists NR PRACH SCs and parameters in a band having a default SC of 15 kHz.

TABLE 2

| Preamble format | Subcarrier spacing | Bandwidth | CP duration | Preamble duration |
|---|---|---|---|---|
| Long #1 | 1.25 kHz | 1.08 MHz | 103 us | 800 us |
| Long #2 | | | 690 us | 800 us |
| Long #3 | | | 203 us | 1600 us |
| Long #4 | | | 690 us | 1600 us |
| Short #1 | 7.5 kHz | | 22.2 us | N * 66.7 us |
| Short #2 | | | 66.7 us | N * 66.7 us |
| Short #3 | | | 133.3 us | N * 66.7 us |

An NR PRACH SC in a band which does not have a default SC of 15 kHz is scaled according to a default SC value. A CP and a preamble duration should be provided through RACH configuration and an RACH Msg1 SC is tied to an RACH time/frequency resource for RACH Msg1 transmission. The UE repeatedly transmits RACH Msg1 using a short sequence on an RACH resource on which repetition is permitted and transmits RACH Msg1 using a long sequence on an RACH resource on which repetition is not permitted.

Hereinabove, the present invention has been described under the assumption that bands below 6 GHz are divided into frequency band(s) having a default SC of 15 kHz and frequency band(s) having a default SC of 30 kHz and bands above 6 GHz are divided into frequency band(s) having a default SC of 120 kHz and frequency band(s) having a default SC of 240 kHz. However, when all bands below 6 GHz support one default SC, for example, when a default SC below 6 GHz is 15 kHz, a plurality of SCs of long sequences for the RACH preamble may be defined per default SC. For example, a long sequence having an SC of 1.25 kHz and a long sequence having an SC of 2.5 kHz may be supported for the default SC used below 6 GHz. The default SC is inevitably associated with a minimum bandwidth (BW) of a system because a band in which a PSS/SSS/PBCH is transmitted will be limited to the minimum BW. In spite of this reason, an SC used for data transmission/reception in a corresponding system may differ from the default SC according to service requirements. In other words, even if the default SC is 15 kHz, an RACH preamble of 1.25 kHz may be used in a band/cell in which an SC used mainly for a data service is 15 kHz and an RACH preamble of 2.5 kHz may be used in a band/cell in which an SC used mainly for a data service is 30 kHz. The TRP may pre-designate an SC value of the long sequence through signaling of RACH configuration. Likewise, a short sequence may also have two candidates and an SC value for the short sequence may also be designated through signaling of RACH configuration. If the SC of the RACH preamble is indicated, the UE may become implicitly aware of the SC used for the data service in a corresponding cell and use an SC associated with the RACH SC as an SC of Msg3 transmission unless additionally signaled. For example, a preamble SC of 1.25 kHz (i.e., an RACH Msg1 SC of 1.25 kHz) may be associated with a data SC of 15 kHz and a preamble SC of 2.5 kHz may be associated with a data SC of 30 kHz. When an SC of 1.25 kHz is indicated through RACH configuration, the UE uses an SC of 15 kHz for Msg3 transmission and, when an SC of 2.5 kHz is indicated through RACH configuration, the UE uses an SC of 30 kHz for Msg3 transmission. In this case, the SC of 1.25 kHz and the SC of 2.5 kHz are examples of preamble SCs, i.e., examples of SCs for RACH Msg1 transmission, and other values may be used. Even if different SC values are used as preamble SCs, the different SC preamble values are configured in association with SC values of data.

When an association relationship is not configured between a default SC and an RACH Msg1 SC, a method of determining an PRACH transmission numerology is described below.

The UE may transmit/receive RACH Msg1 and then Msg2, Msg3, or Msg4 using a numerology used for PSS/SSS detection. If a numerology to be used for DL data and UL data transmission/reception after a PRACH procedure becomes different, a numerology used for data transmission/reception may be signaled in RACH Msg2 or RACH Msg4.

If a numerology used for PSS/SSS transmission is different from a numerology used for PBCH transmission or if a PSS/SSS is multiplexed with a PBCH through TDM, the UE may conform to the numerology used for PBCH transmission as a numerology used for PRACH transmission. In consideration of multiplexing of the PBCH with other data and multiplexing of a PRACH resource with other data, the numerology used for PRACH transmission may conform to the numerology used for PBCH transmission.

Next, the PRACH response (i.e., Msg2) as a response to Msg1 may be transmitted based on a numerology used when the UE transmits PRACH Msg1 and the UE may transmit information about one or more numerologies and about use cases that the UE desires to use in Msg1. Upon transmitting an RAR for PRACH Msg1, the eNB may designate and transmit a numerology to be used for Msg3 and Msg4 transmission. Alternatively, a numerology to be used for data transmission/reception may be indicated by the RAR. When information about an additional numerology is not transmitted, the UE may transmit/receive subsequent messages and DL/UL signals using a numerology associated with a numerology used thereby for PRACH Msg1.

There may be some options for an RACH numerology. The first option is to conform to an SS block numerology. There may be predefined implicit mapping to a PSS/SSS numerology and/or a PBCH numerology may be performed based on the SS block numerology. That is, the UE may implicitly determine a PRACH numerology based on a detected PSS/SSS and/or PBCH numerology without an explicit signal for the PRACH numerology. If PRACH configuration is provided in the form of a shared data channel similarly to the LTE system using a common search space in a DL control region, this option will be proper because the UE has no information about a numerology for data/control. If this option is used, at least RACH Msg1 and RACH Msg2 may share the same numerology or may be tied to the PSS/SSS numerology and/or the PBCH numerology. Another option is to signal the RACH numerology through essential SI. PRACH configuration provides numerologies for the PRACH and the RAR. Basically, a numerology of Msg3 may conform to a numerology of Msg1 and a numerology of Msg4 may conform to a numerology of Msg2 unless the RAR indicates the numerologies of Msg3 and Msg4. Msg4 may indicate a numerology for a later DL/UL data/control channel.

If the RACH procedure, i.e., a PRACH procedure, is completed, the UE acquires DL/UL time/frequency synchronization, a cell ID, a cell associated UE ID, and other SI and is ready to receive DL data and transmit UL data. Accordingly, if the RACH procedure, i.e., the PRACH procedure, is completed, the UE is in an RRC_connected state and may end the initial access procedure.

B. Minimum SI Delivery

Hereinafter, details of how SI is delivered will be discussed. A PBCH delivers a part of minimum SI. RMSI is transmitted on a PDSCH and the PBCH may provide configuration information of the RMSI in order to cause the UE to retrieve the SI.

<B.1. Signaling of Configuration Information for RMSI>

There may be a method of providing the configuration information of the RMSI. For example, the PBCH may provide a control channel search space or scheduling allocation for the RMSI. If the PBCH provides the control channel search space such as a common search space (CSS) having a beam-specific characteristic in mmWave, the UE searches for a control channel to receives minimum SI. Although this method may consume the control channel search space, the method provides much flexibility to the NR system in terms of resource allocation, an MCS, etc. Alternatively, although a specific search space may not be necessary, the search space may be confined within an SS block transmission bandwidth. For SI reception, the NR system may configure non-UE dedicated search spaces for control channels, which may be SS-block specific or UE-group specific. A set of these search spaces may be predefined by communication standard and an NR-PBCH may signal specific set(s) of search spaces for the RMSI. Another method serves to cause the PBCH to provide scheduling allocation of the RMSI including resource allocation, an applied MCS, etc. In consideration of the fact that the content of the PBCH is not frequently changed, resources for the RMSI may be semi-statically reserved using a fixed MCS in a system. To reduce signaling overhead within the PBCH, a part of the configuration information may be specified by a communication specification and the UE may derive accurate configuration information by a combination of signaling within the PBCH and the communication specification.

The information that can be specified by the communication specification for minimum SI reception includes numerologies, candidate MCS sets, control search space candidates, and/or subband candidates.

<B.2. Content of Configuration Information for RMSI>

According to signaling options of the configuration information for the RMSI, the content of the configuration information about the RMSI may be as follows.

*Option B.2-1) The PBCH provides information about the control channel search space.

The PBCH may carry the information about the control channel search space in which a PDCCH for scheduling the RMSI (hereinafter, an RMSI PDCCH) is transmitted, for example, information about a frequency resource on which the RMSI PDCCH may be present. The PBCH may carry information indicating that the control channel search space may be a CSS or a beam-specific space and/or numerology information. The numerology information may include, for example, an SC of the control channel, possibly, an SC for a PDSCH carrying the RMSI (this information may also be signaled within a control channel (or DCI) rather than the PBCH), a slot or a min-slot which is a time interval in which the UE should blind-detect the control channel (or DCI) in the time domain, and/or timing information about a timing at which minimum SI can be transmitted. The timing information includes, for example, a minimum SI periodicity, a timing offset from detection of the PBCH, and/or a timing window in which minimum SI can be transmitted. The information carried by the control channel (or DCI) includes, for example, time-frequency resource allocation information and/or an MCS.

*Option B.2-2) the PBCH Provides Scheduling Allocation Information.

The scheduling allocation information includes time-frequency resource allocation information, an MCS, and/or numerology information of minimum SI. The numerology information of the minimum SI includes, for example, an SC of a PDSCH carrying the minimum SI, a slot or mini-slot length in the time domain, the number of symbols occupied by the PDSCH carrying the minimum SI, and/or timing information about a timing at which the minimum SI can be transmitted. The timing information includes a minimum SI periodicity, a timing offset from detection of the PBCH, and/or a timing window in which the minimum SI can be transmitted.

Since the RMSI is provided through the PDSCH, a numerology for the RMSI, particularly, an SC for the RMSI, should be identical to an SC for the PDSCH. To reduce overhead in the PBCH, default numerologies for a PDCCH/PDSCH/PUSCH/PUCCH may be defined. The default numerologies for the PDCCH/PDSCH/PUSCH/PUCCH may be provided through a broadcast channel such as the PBCH or may be predefined in the communication standard with respect to each frequency range. The SC for the RMSI may conform to the default numerologies for the PDCCH/PDSCH.

Figure 12:
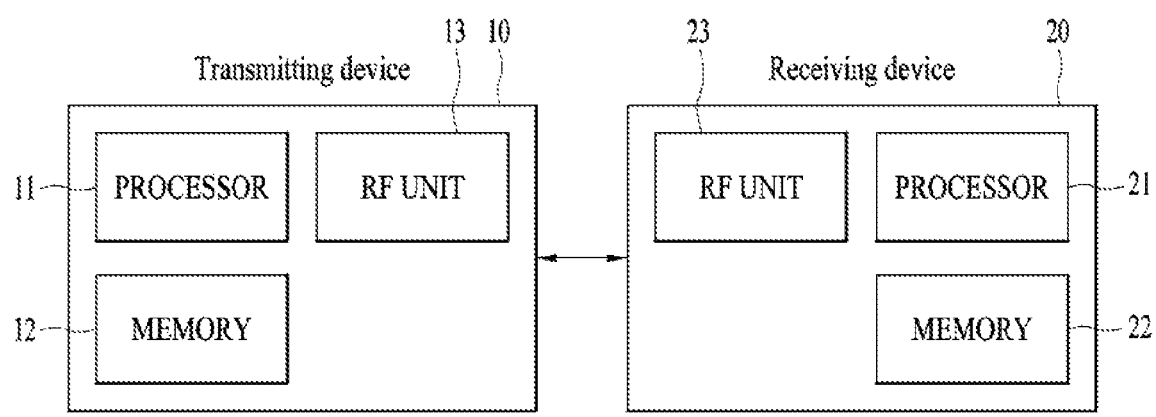
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described examples of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the examples of the present invention, a UE operates as the transmitting device 10 in UL and as the receiving device 20 in DL. In the examples of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor and the UE processor may perform an initial access procedure according to a proposal of the present invention. The eNB processor may control the eNB RF unit to transmit a PSS, an SSS, and a PBCH according to the proposal of the present invention. The UE processor may control detect the PSS, the SSS, and the PBCH by controlling the UE RF unit and acquire DL time/frequency synchronization with a cell according to the proposal of the present invention. The UE processor may perform an RACH procedure for UL synchronization with the cell according to the proposal of the present invention. The UE processor may control the UE RF unit to transmit RACH Msg1 according to the proposal of the present invention. The eNB processor may control the eNB RF unit to receive RACH Msg1 and control the eNB RF unit to transmit RACH Msg2 according to the proposal of the present invention. The UE processor may control the UE RF unit to receive RACH Msg2 and control the UE RF unit to transmit RACH Msg3 according to the proposal of the present invention. The eNB processor may control the eNB RF unit to receive RACH Msg3 and control the UE RF unit to transmit RACH Msg4 according to the proposal of the present invention.

The eNB processor may control the eNB RF unit to transmit essential SI according to the proposal of the present invention. The UE processor may control the UE RF unit to receive the essential SI according to the proposal of the present invention.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The examples of the present invention are applicable to a base station, a user equipment, or other devices in a wireless communication system.

What is claimed is:

1. A method performed by a user equipment in a wireless communication system, the method comprising:
   receiving a synchronization signal/physical broadcast channel (SS/PBCH) block based on a first subcarrier spacing,
   wherein the first subcarrier spacing is based on each of frequency ranges, and
   wherein the SS/PBCH block includes a primary synchronization signal (PSS), a secondary synchronization signal (SSS), and a PBCH; and
   receiving a physical downlink shared channel (PDSCH) based on one of second subcarrier spacings,
   wherein the PBCH carries information related to the one of second subcarrier spacings per each of the frequency ranges, and
   wherein a same subcarrier spacing is configured for the PSS, the SSS, and the PBCH.

2. The method of claim 1, wherein the PDSCH carries system information.

3. The method of claim 1, wherein the PDSCH is related to a Msg2 of a random access response or a Msg4 of a contention resolution for an initial access, and the subcarrier spacing for the Msg2 is identical to the subcarrier spacing for the Msg4.

4. The method of claim 1,
   wherein the PBCH carries configuration information on a search space for receiving control information related to the PDSCH.

5. A user equipment in a wireless communication system, the user equipment comprising:
   a transmitter;
   a receiver; and
   at least one processor coupled with the transmitter and the receiver,
   wherein the at least one processor is configured to:
   control the receiver to receive a synchronization signal/physical broadcast channel (SS/PBCH) block based on a first subcarrier spacing,
   wherein the first subcarrier spacing is based on each of frequency ranges, and
   wherein the SS/PBCH block includes a primary synchronization signal (PSS), a secondary synchronization signal (SSS), and a PBCH; and
   control the receiver to receive a physical downlink shared channel (PDSCH) based on one of second subcarrier spacings,
   wherein the PBCH carries information related to the one of second subcarrier spacings per each of the frequency ranges, and
   wherein a same subcarrier spacing is configured for the PSS, the SSS, and the PBCH.

6. A method performed by a base station in a wireless communication system, the method comprising:
   transmitting a synchronization signal/physical broadcast channel (SS/PBCH) block based on a first subcarrier spacing,
   wherein the first subcarrier spacing is based on each of frequency ranges, and
   wherein the SS/PBCH block includes a primary synchronization signal (PSS), a secondary synchronization signal (SSS), and a PBCH; and
   transmitting a physical downlink shared channel (PDSCH) based on one of second subcarrier spacings,
   wherein the PBCH carries information related to the one of second subcarrier spacings per each of the frequency ranges, and
   wherein a same subcarrier spacing is configured for the PSS, the SSS, and the PBCH.

7. A base station in a wireless communication system, the base station comprising:
   a transmitter;
   a receiver; and
   at least one processor coupled with the transmitter and the receiver,
   wherein the at least one processor is configured to:
   control the transmitter to transmit a synchronization signal/physical broadcast channel (SS/PBCH) block based on a first subcarrier spacing,
   wherein the first subcarrier spacing is based on each of frequency ranges, and
   wherein the SS/PBCH block includes a primary synchronization signal (PSS), a secondary synchronization signal (SSS), and a PBCH; and
   control the transmitter to transmit a physical downlink shared channel (PDSCH) based on one of second subcarrier spacings,
   wherein the PBCH carries information related to the one of second subcarrier spacings per each of the frequency ranges, and
   wherein a same subcarrier spacing is configured for the PSS, the SSS, and the PBCH.

8. A processing apparatus configured to control a user equipment (UE) in a wireless communication system, the processing apparatus comprising:
   at least one processor; and
   at least one computer memory operably connected to the at least one processor and storing instructions that, based on being executed by the at least one processor, perform operations comprising:
   receiving a synchronization signal/physical broadcast channel (SS/PBCH) block based on a first subcarrier spacing,
   wherein the first subcarrier spacing is based on each of frequency ranges, and
   wherein the SS/PBCH block includes a primary synchronization signal (PSS), a secondary synchronization signal (SSS), and a PBCH; and
   receiving a physical downlink shared channel (PDSCH) based on one of second subcarrier spacings,
   wherein the PBCH carries information related to the one of second subcarrier spacings per each of the frequency ranges, and
   wherein a same subcarrier spacing is configured for the PSS, the SSS, and the PBCH.

* * * * *